(12) United States Patent (10) Patent No.: US 7,900,733 B2
Miyabe (45) Date of Patent: Mar. 8, 2011

(54) MOTORCYCLE

(75) Inventor: Toshimasa Miyabe, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 170 days.

(21) Appl. No.: 12/410,241

(22) Filed: Mar. 24, 2009

(65) Prior Publication Data

US 2009/0242306 A1 Oct. 1, 2009

(30) Foreign Application Priority Data

Mar. 27, 2008 (JP) ................................. 2008-083232

(51) Int. Cl.
*B60K 31/00* (2006.01)
(52) U.S. Cl. ......... 180/219; 180/170; 180/172; 180/272; 180/287; 307/10.3; 307/10.6
(58) Field of Classification Search .................. 180/219, 180/170, 172, 174, 272, 287; 307/10.3, 10.6
See application file for complete search history.

(56) References Cited

U.S. PATENT DOCUMENTS

| 4,037,683 | A  | * | 7/1977  | LeBell ........................... 180/272 |
| 6,135,227 | A  | * | 10/2000 | Laning .......................... 180/170 |
| 6,820,710 | B2 | * | 11/2004 | Fechner ......................... 180/170 |
| 7,445,071 | B2 | * | 11/2008 | Yamazaki et al. ............ 180/219 |
| 7,533,752 | B2 | * | 5/2009  | Mochizuki et al. ........... 180/219 |
| 7,546,829 | B2 | * | 6/2009  | Samoto et al. ................ 123/399 |
| 2007/0144806 | A1 | * | 6/2007 | Mochizuki et al. ........... 180/219 |
| 2008/0099266 | A1 | * | 5/2008 | Hiroi et al. .................... 180/219 |
| 2008/0103663 | A1 | * | 5/2008 | Hiroi .............................. 701/54 |

FOREIGN PATENT DOCUMENTS

JP 10-297364 11/1998

* cited by examiner

*Primary Examiner* — Lesley Morris
*Assistant Examiner* — Michael R Stabley
(74) *Attorney, Agent, or Firm* — Keating & Bennett, LLP

(57) ABSTRACT

A motorcycle with reduced fuel consumption. A centrifugal clutch intermittently transfers torque from an engine to a drive wheel in accordance with engine speed. A brake lock switch regulates the engine speed. When the brake lock switch is off, engine start inhibition control is executed. When the brake lock switch is on, engine speed regulation control is executed to prevent engagement of the centrifugal clutch.

11 Claims, 20 Drawing Sheets

US 7,900,733 B2

MOTORCYCLE

RELATED APPLICATIONS

This application claims the benefit of priority under 35 USC 119 of Japanese patent application no. 2008-083232, filed on Mar. 27, 2008, which is hereby incorporated by reference.

BACKGROUND OF THE INVENTION

1. Field of the Invention

The present invention relates to a motorcycle.

2. Description of Related Art

JP-A-Hei 10-297364 describes a motorcycle with a switch for regulating start-up of an engine. As a structure to regulate the start-up of the engine, the motorcycle in JP-A-Hei 10-297364 includes a brake lever, a switch case, a swing plate, a pushrod, and a switch corresponding to actuation of the pushrod. The brake lever actuates the swing plate. The swing plate actuates the pushrod. The pushrod actuates the switch.

In order to operate the above structure, a rider first pulls the brake lever. Corresponding to the brake lever operation, the swing plate makes a given rotation on a fixed position and pushes the pushrod. This allows the pushrod to actuate and turn on the switch. Once the switch is on, the motorcycle comes into a state where the engine can be started.

However, the switch does not regulate the engine speed after the engine has started and before the motorcycle starts moving. Thus, when the rider lets the engine to idle, it causes a problem of wasted fuel consumption.

SUMMARY OF THE INVENTION

The present invention addresses this problem and provides a motorcycle that reduces fuel consumption.

A motorcycle according to the present invention includes: an engine; a drive wheel driven by engine torque; a centrifugal clutch for intermittently transferring torque from the engine to the drive wheel in accordance with the engine speed; a switch for regulating engine speed; an engine start inhibition section for inhibiting start-up of the engine when the switch is off; and an engine speed regulation section for regulating the engine speed to prevent engagement of the centrifugal clutch when the switch is on.

As described above, with the present invention, fuel consumption of the motorcycle is reduced.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 3 is a plan view showing positional relationships among a body frame, an engine unit, an air chamber, and the like.

FIG. 4 is a sectional view taken along line IV-IV of FIG. 1 showing positional relationships among a main frame, a rear arm, the air chamber, and the like.

DETAILED DESCRIPTION OF THE INVENTION

Figure 1:
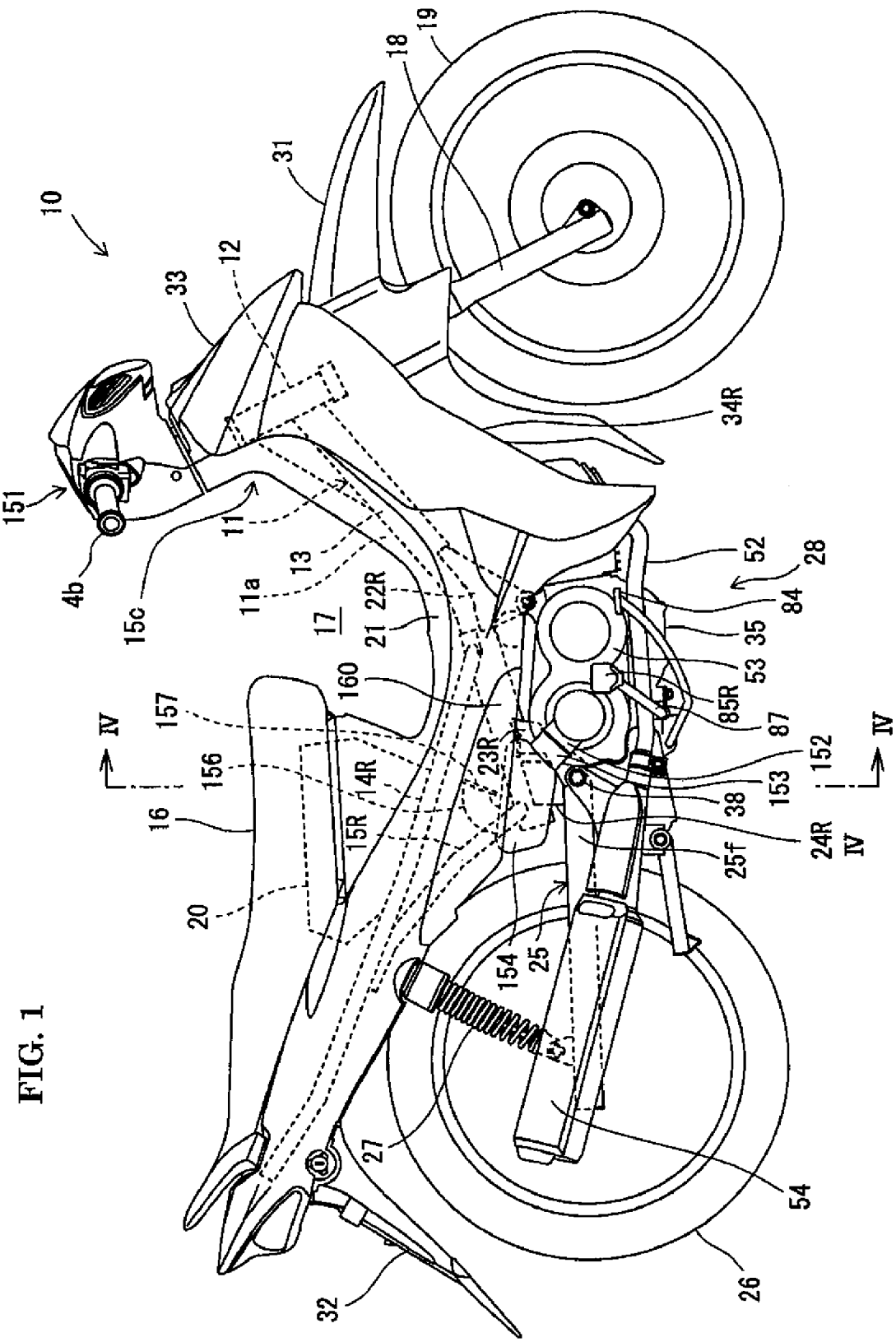
FIG. 1 is a side view of a motorcycle according to an embodiment of the present invention.

An embodiment of the present invention is now described in detail with reference to the drawings. As shown in FIG. 1, a straddle-type vehicle according to this embodiment is a motorcycle 10. The motorcycle 10 includes a body frame 11 defining a framework thereof and a seat 16 for a rider to be seated. Motorcycle 10 is a so-called moped type. In other words, the motorcycle 10 is formed with a concave space 17 in a side view, which is depressed downwardly, in front of the seat 16, and a rider seated on the seat 16 straddles the body frame 11. Here, the term "moped type" simply indicates a type of vehicle configuration, and does not limit the top speed, displacement, size, or the like of the vehicle in any way.

The straddle-type vehicle according to the present invention is not limited to the so-called moped type, and may be a different type of motorcycle such as one having a fuel tank in front of the seat.

In the following description, the terms "front", "rear", "right", and "left" refer to directions as viewed from the rider seated on the seat 16. The body frame 11 includes a steering head pipe 12, a main frame 13 extending obliquely downward to the rear from the steering head pipe 12, left and right seat rails 14L, 14R extending obliquely upward to the rear from a midsection of the main frame 13, and left and right seat pillar tubes 15L, 15R connected to a rear end of the main frame 13 and also connected respectively to midsections of the seat rails 14L, 14R.

A body cover 21 covers the upper side and lateral sides of the body frame 11. The concave space 17 in a side view, which is depressed downwardly, is defined above the body cover 21 and in front of the seat 16. In addition, a center tunnel 11a is defined under the body cover 21 as a passage of the main frame 13.

A front wheel 19 is supported by the steering head pipe 12 via front forks 18. A fuel tank 20 and the seat 16 are supported on the seat rails 14L, 14R. The seat 16 extends from a position above the fuel tank 20 toward rear ends of the seat rails 14L, 14R. The fuel tank 20 is disposed on front-halves of the seat rails 14L, 14R, and is covered with the body cover 21 and the seat 16.

A left and right pair of first engine brackets 22L, 22R protrudes downward from the midsection of the main frame 13. The rear end of the main frame 13 is provided with a left and right pair of second engine brackets 23L, 23R and a left and right pair of rear arm brackets 24L, 24R. The brackets provided on the main frame 13 and the like, more specifically, the first engine brackets 22L, 22R, the second engine brackets 23L, 23R, and the rear arm brackets 24L, 24R constitute a part of the body frame 11.

Figure 3:
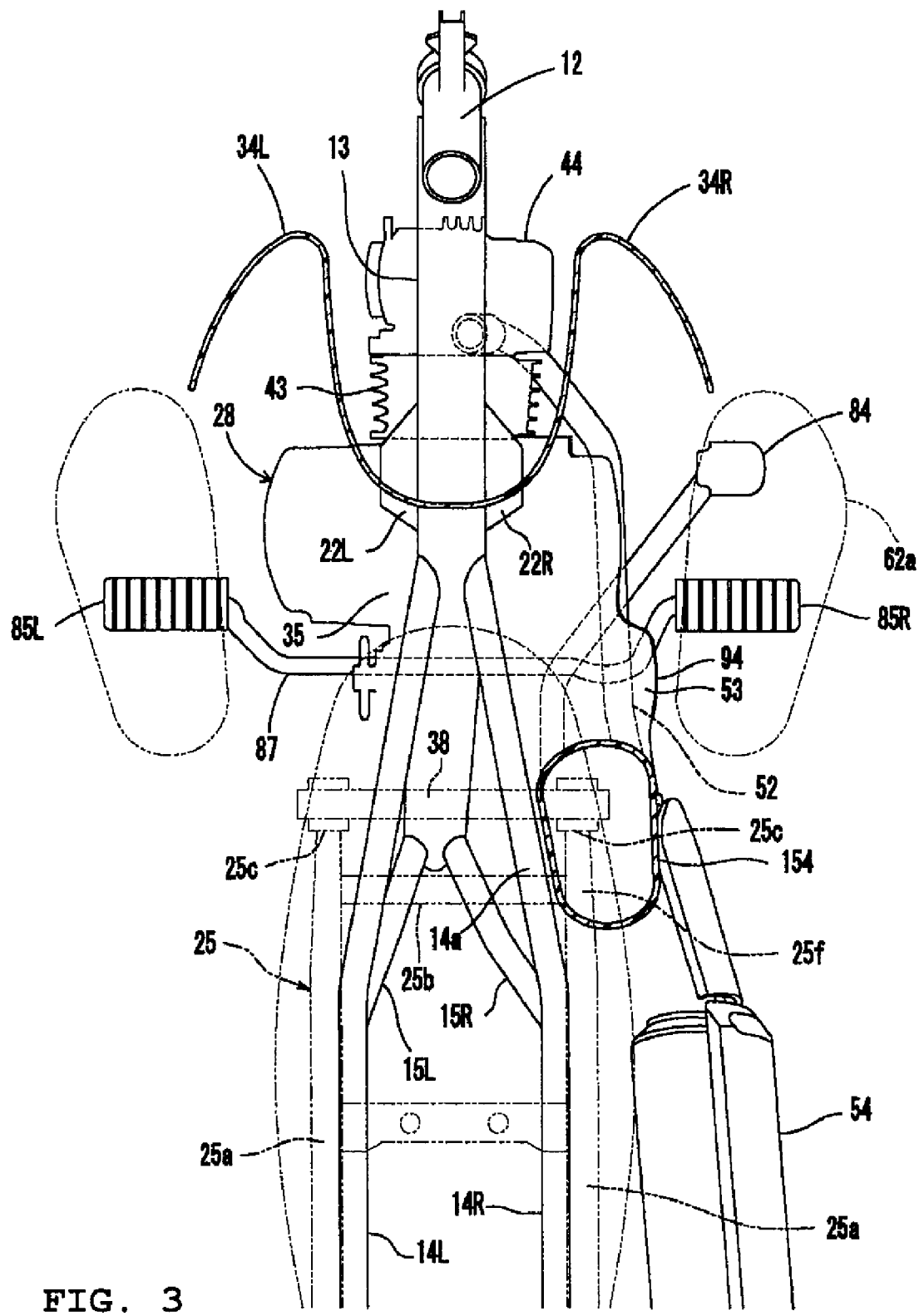

As shown in FIG. 3, a rear arm 25 includes a left and right pair of arm sections 25a and a coupling section 25b for coupling the arm sections 25a to each other. A front end of each arm section 25a is provided with a pivot section 25c through which a pivot shaft 38 is inserted.

Figure 4:
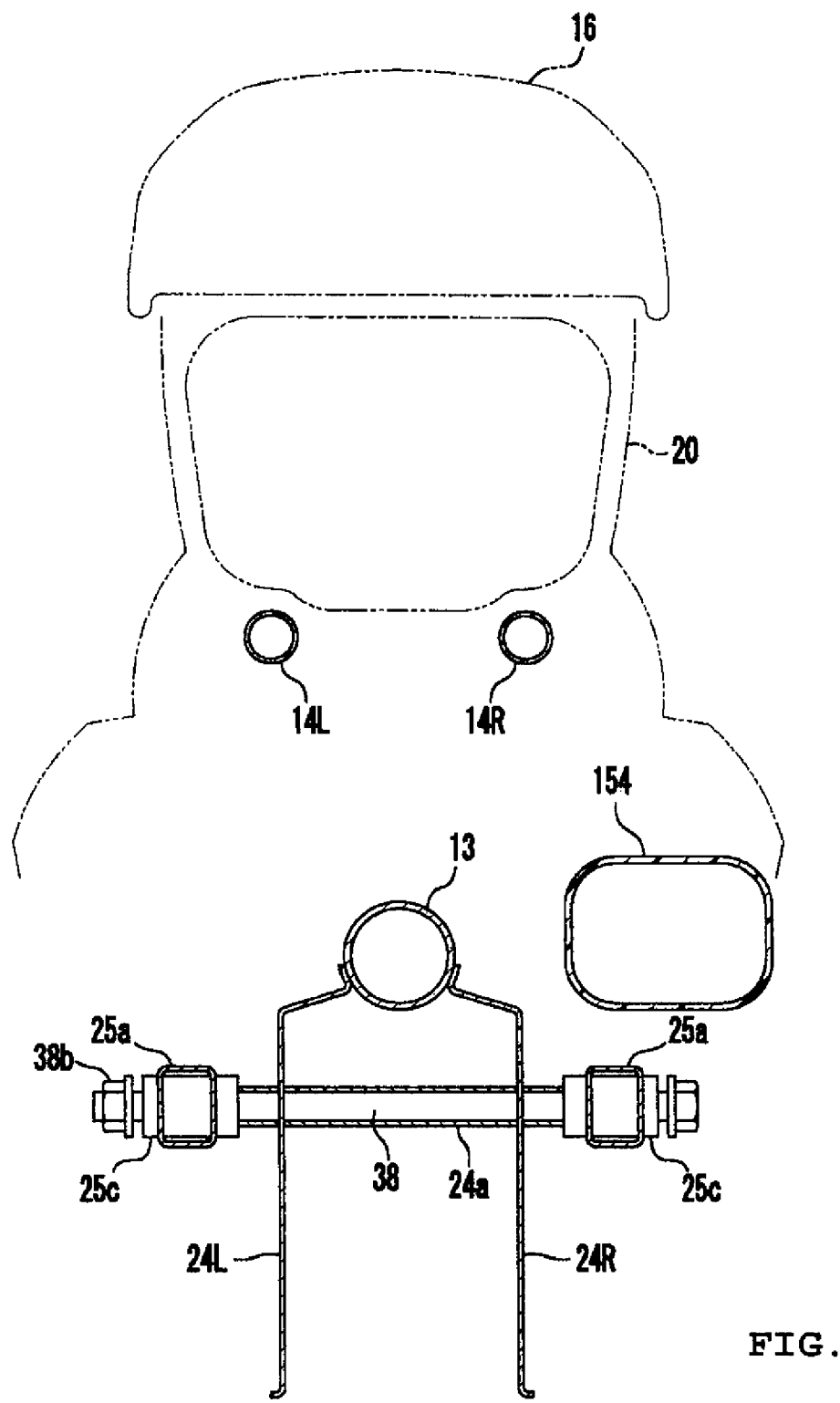

The rear arm brackets 24L, 24R protrude downward from the rear end of the main frame 13. As shown in FIG. 4, rear arm brackets 24L, 24R are provided with a pipe 24a. The pivot shaft 38 passes through pipe 24a as well as the pivot sections 25c. In this embodiment, the pivot shaft 38 is constituted by a long bolt, and the left end of the pivot shaft 38 is secured with a nut 38b. This allows the rear arm 25 to be swingably supported at its front end by the pivot shaft 38. A rear wheel 26 is supported at a rear end of the rear arm 25. A rear half of the rear arm 25 is suspended by the body frame 11 via a cushion unit 27.

Figure 7:
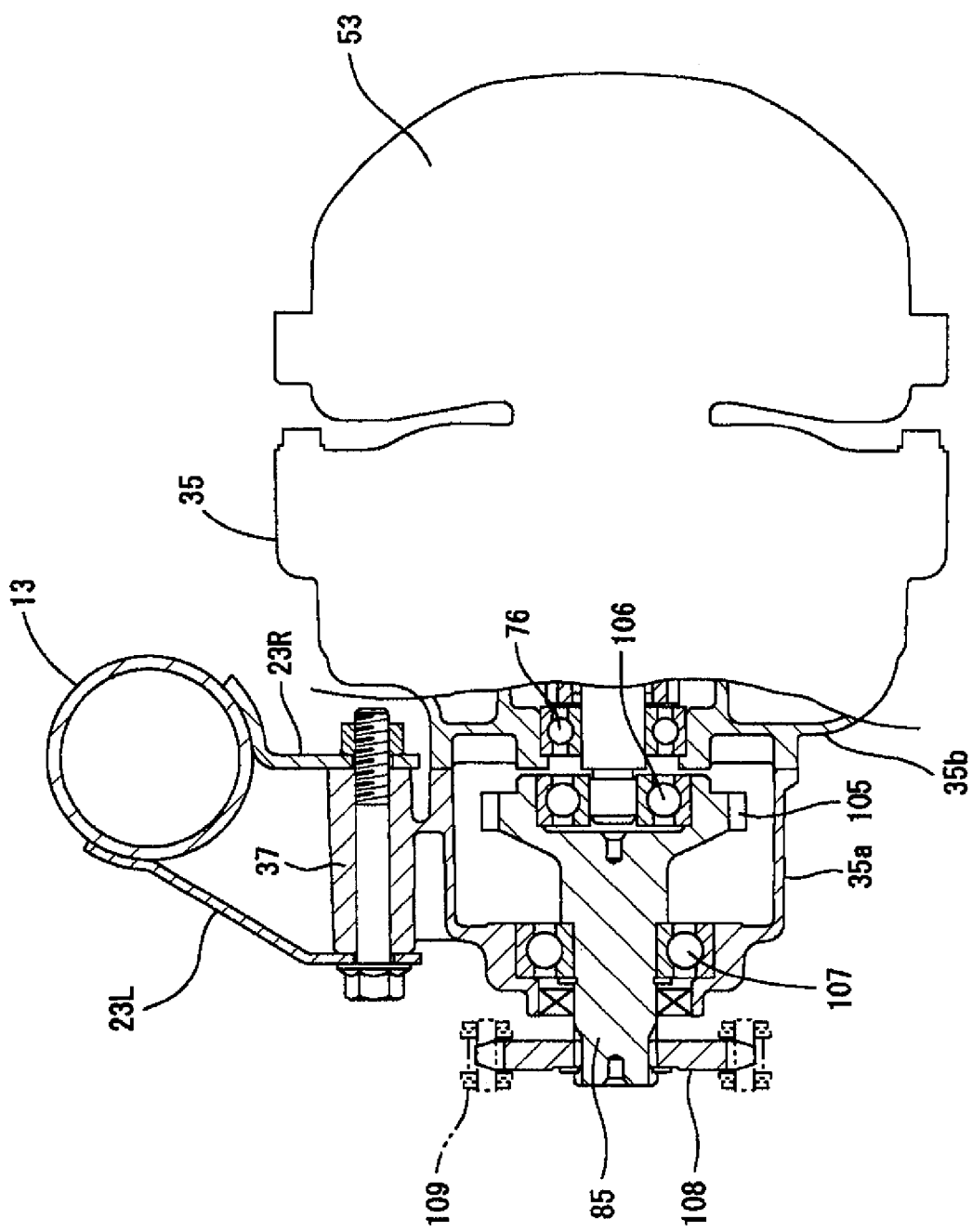
FIG. 7 is a cross-sectional view showing a mounting state of the engine unit.

As shown in FIG. 7, the second engine brackets 23L, 23R protrude downward from the rear end of the main frame 13. Second engine brackets 23L, 23R face each other with a distance therebetween in a vehicle width direction.

Figure 6:
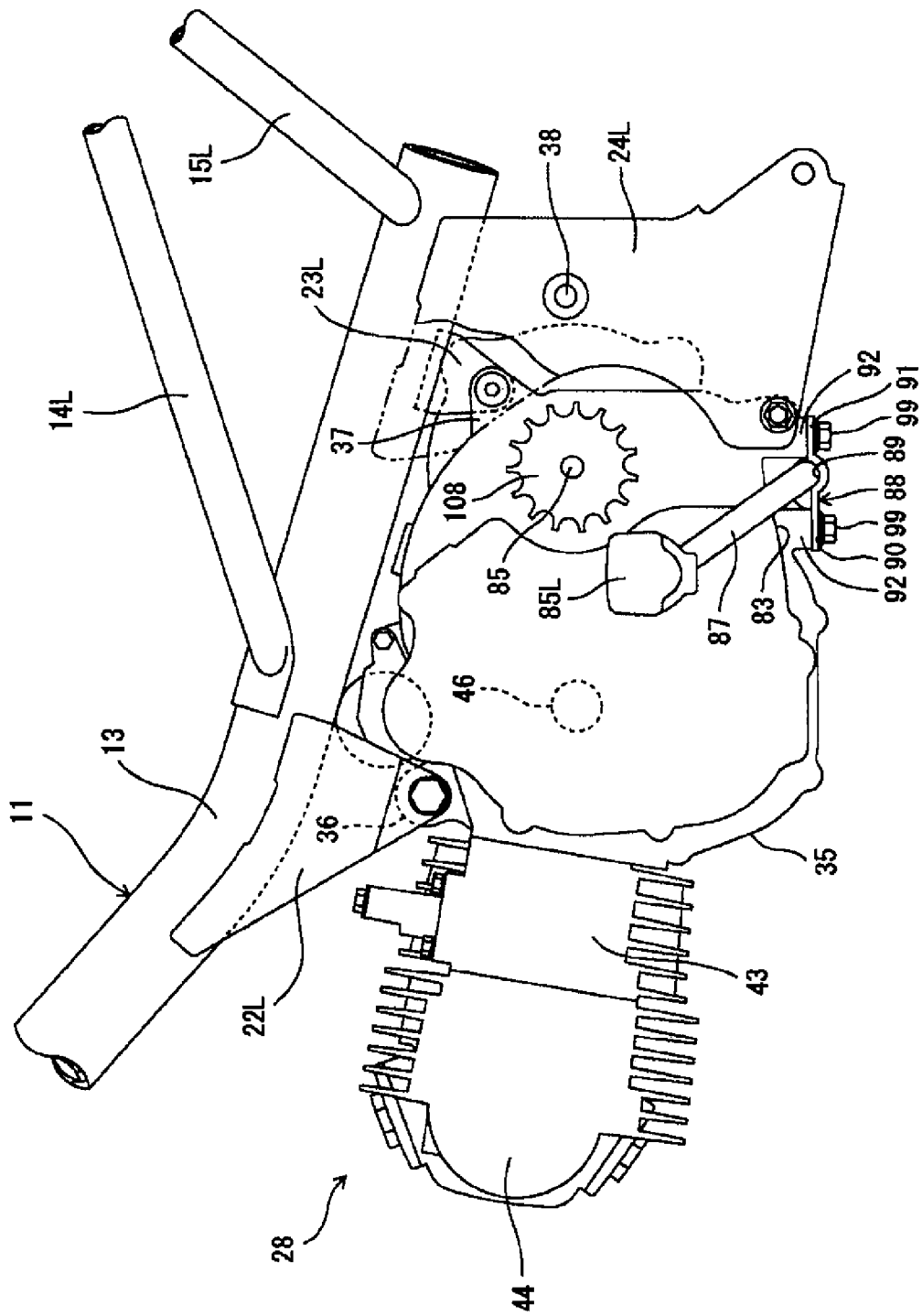
FIG. 6 is a left side view of the engine unit.

As shown in FIG. 1, an engine unit 28 for driving the rear wheel 26 is supported by the body frame 11. More specifically, as shown in FIG. 6, the engine unit 28 includes a crankcase 35, a cylinder 43, and a cylinder head 44. The crankcase 35 has first and second engine mounts 36, 37. The first engine mount 36 protrudes upward from the top at the front end of the crankcase 35, and is supported by the first engine brackets 22L, 22R. The second engine mount 37 protrudes obliquely upward to the rear from the upper side at the rear end of the crankcase 35, and is supported by the second engine brackets 23L, 23R (also see FIG. 7). Thus, the crankcase 35 is supported by and suspended from the main frame 13.

As the detail will be described later, the engine unit 28 includes an engine 29 and a belt-type continuously variable transmission (hereinafter referred to as CVT) 30 (see FIG. 8). The type of the engine 29 is not limited in any way; however, in this embodiment, the engine 29 is a four-stroke single-cylinder engine.

As shown in FIG. 1, the motorcycle 10 has a front fender 31 for covering the upper side and the rear side of the front wheel 19, and a rear fender 32 for covering the obliquely upper side at the rear of the rear wheel 26.

In addition to the body cover 21, the motorcycle 10 includes a front fairing 33 and left and right leg shields 34L, 34R. The leg shields 34L, 34R are cover members for covering front parts of the rider's legs, and extend obliquely in a vertical direction.

As shown in FIG. 3, each of the leg shields 34L, 34R has a concave shape that opens rearward in a horizontal cross section. In other words, each of the leg shields 34L, 34R is generally C-shaped and tapered forwardly in a cross section.

Figure 2:
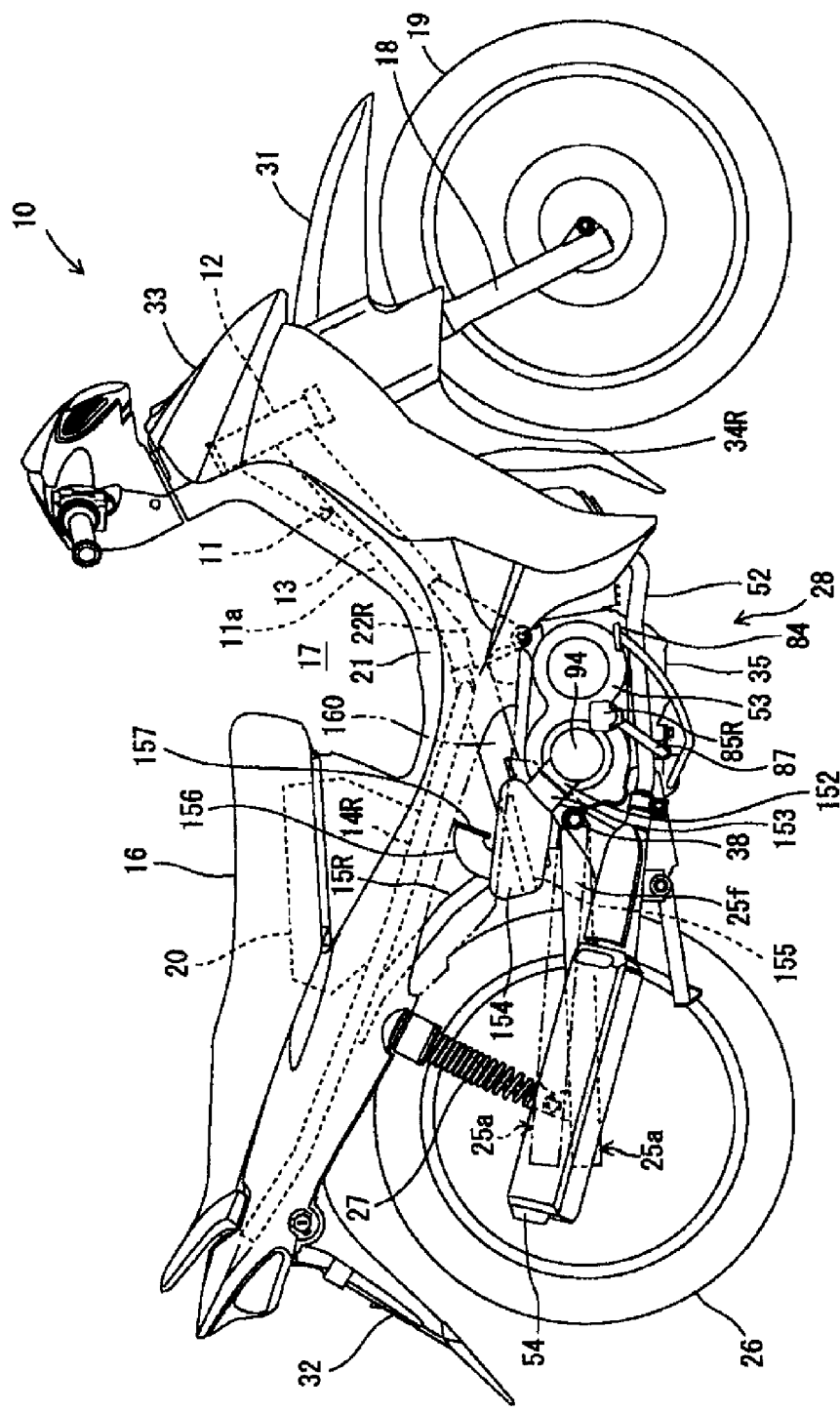
FIG. 2 is a side view showing actuation of a cushion unit according to the embodiment of the present invention.

As shown in FIGS. 2 and 4, an air chamber 154 is disposed above a front portion 25f of the right arm section 25a of the rear arm 25. Here, the front portion 25f of the arm section 25a indicates a portion in front of the midsection of the arm section 25a in a longitudinal direction.

An intake duct 153 is connected to the air chamber 154. A portion of the intake duct 153 on the air chamber 154 side is also disposed above the front portion 25f of the arm section 25a of the rear arm 25. However, the intake duct 153 may be deviated from a position above the front portion 25f of the arm section 25a. In addition, a major part of the intake duct 153 may be situated above the front portion 25f of the arm section 25a.

As shown in FIG. 2, a suction duct 156 is provided on the air chamber 154. The suction duct 156 is constituted by a curved pipe, and an intake port 157 of the suction duct 156 opens obliquely downward to the front. However, no limitation is imposed on the opening direction of the intake port 157. The intake port 157 may open forward, obliquely upward to the front, or in other directions. A filter 155 is accommodated in the air chamber 154.

As shown in FIG. 1, the upper right side of the air chamber 154 and the right side of the suction duct 156 are covered with the cover 160. The cover 160 covers a portion of the main frame 13 and that of the seat pillar tube 15R from the side, and is a separate member from the body cover 21 that covers the seat rails 14L, 14R. However, the cover 160 and the body cover 21 can be integrated as long as they do not interfere with downsizing of the vehicle in the vehicle width direction. In other words, the cover 160 may be a part of the body cover 21.

As shown in FIG. 3, footrests 85L, 85R made of rubber or the like are disposed on the left and the right of the engine unit 28. The footrests 85L, 85R are supporting members on which the rider places his/her feet and are supported by the crankcase 35 of the engine unit 28 via a coupling rod 87 that is made of metal and a mounting plate 88 fixed to the coupling rod 87 (see FIGS. 5 and 6).

Figure 5:
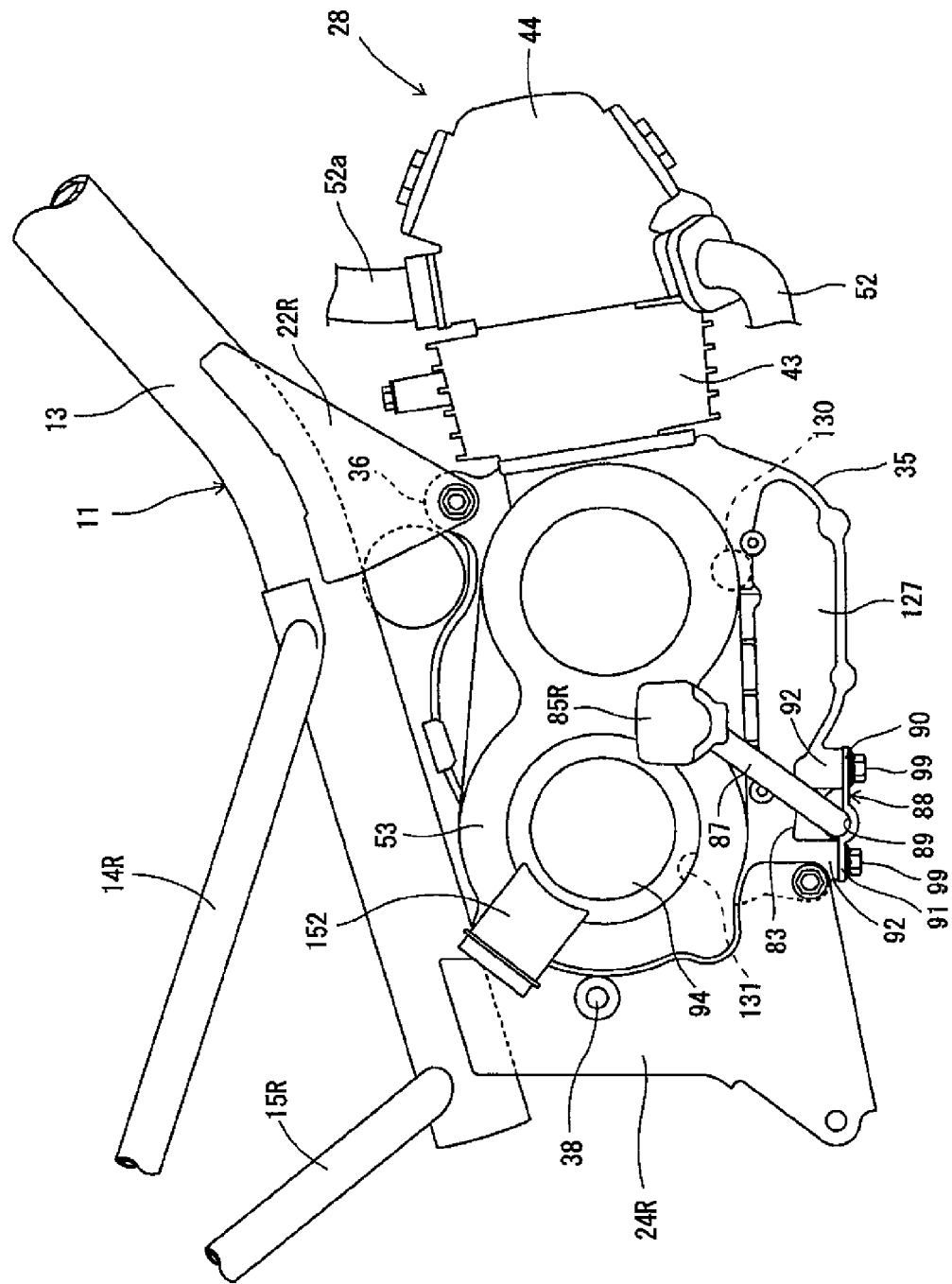
FIG. 5 is a right side view of the engine unit.

The coupling rod 87 passes below the rear half of the crankcase 35 and extends in the vehicle width direction. The left end of the coupling rod 87 protrudes from the left side of the crankcase 35 and supports the left footrest 85L. The right end of the coupling rod 87 protrudes from the right side of a transmission case 53 and supports the right footrest 85R. As shown in FIG. 5, the mounting plate 88 is formed by pressing a metal plate, and a recess 89 to which the coupling rod 87 is fitted is formed in the midsection of the mounting plate 88 in the longitudinal direction. The recess 89 is abutted on the coupling rod 87 from below, and is welded to the peripheral surface of the coupling rod 87.

The mounting plate 88 has a flange-like first mounting portion 90 that protrudes in front of the coupling rod 87 and a flange-like second mounting portion 91 that protrudes to the rear of the coupling rod 87. The first mounting portion 90 and the second mounting portion 91 extend in an axial (left and right) direction of the coupling rod 87, and face a bottom surface 83 in the rear half of the crankcase 35.

The bottom surface 83 in the rear half of the crankcase 35 has four bosses 92 (only two are shown in FIG. 5). Bosses 92 protrude downward from the bottom surface 83 of the crankcase 35, and are formed integrally with the crankcase 35. A bolt hole is formed in each of the bosses 92. The mounting plate 88 of the footrests 85L, 85R is also formed with bolt holes in positions corresponding to the bosses 92. The mounting plate 88 and the bosses 92 are fastened by bolts 99. The footrests 85L, 85R are fixed to the crankcase 35 by the bolts 99 via the coupling rod 87 and the mounting plate 88.

The internal structure of the engine unit 28 is now described. As shown in FIG. 8, the engine unit 28 includes the engine 29, the CVT 30, a centrifugal clutch 41, and a deceleration mechanism 42.

The engine 29 includes the crankcase 35, the cylinder 43 connected to the crankcase 35, and the cylinder head 44 connected to the cylinder 43. The crankcase 35 is split into a first case block 35a located on the left and a second case block 35b located on the right. The first case block 35a and the second case block 35b are abutted on each other along the vehicle width direction.

A crankshaft 46 is accommodated in the crankcase 35. The crankshaft 46 extends in the vehicle width direction, and is situated horizontally. The crankshaft 46 is supported by the first case block 35a via a bearing 47, and is also supported by the second case block 35b via a bearing 48.

A piston 50 is slidably inserted in the cylinder 43. The piston 50 is coupled to an end of a connecting rod 51. A crankpin 59 is provided between a left crank arm 46a and a right crank arm 46b of the crankshaft 46. The other end of the connecting rod 51 is coupled to the crankpin 59.

The cylinder head 44 is formed with a recess 44a and intake and exhaust ports that communicate with the recess 44a. A spark plug 55 is inserted in the recess 44a. As shown in FIG. 5, an intake pipe 52a is connected to the intake port, and an exhaust pipe 52 is connected to the exhaust port. As shown in FIGS. 1 and 3, the exhaust pipe 52 extends rearward and obliquely downward from the cylinder head 44 to the right, then passes below the transmission case 53 of the engine unit 28, further extends rearward, and is connected to a muffler 54 disposed on the right side of the rear wheel 26.

Figure 8:
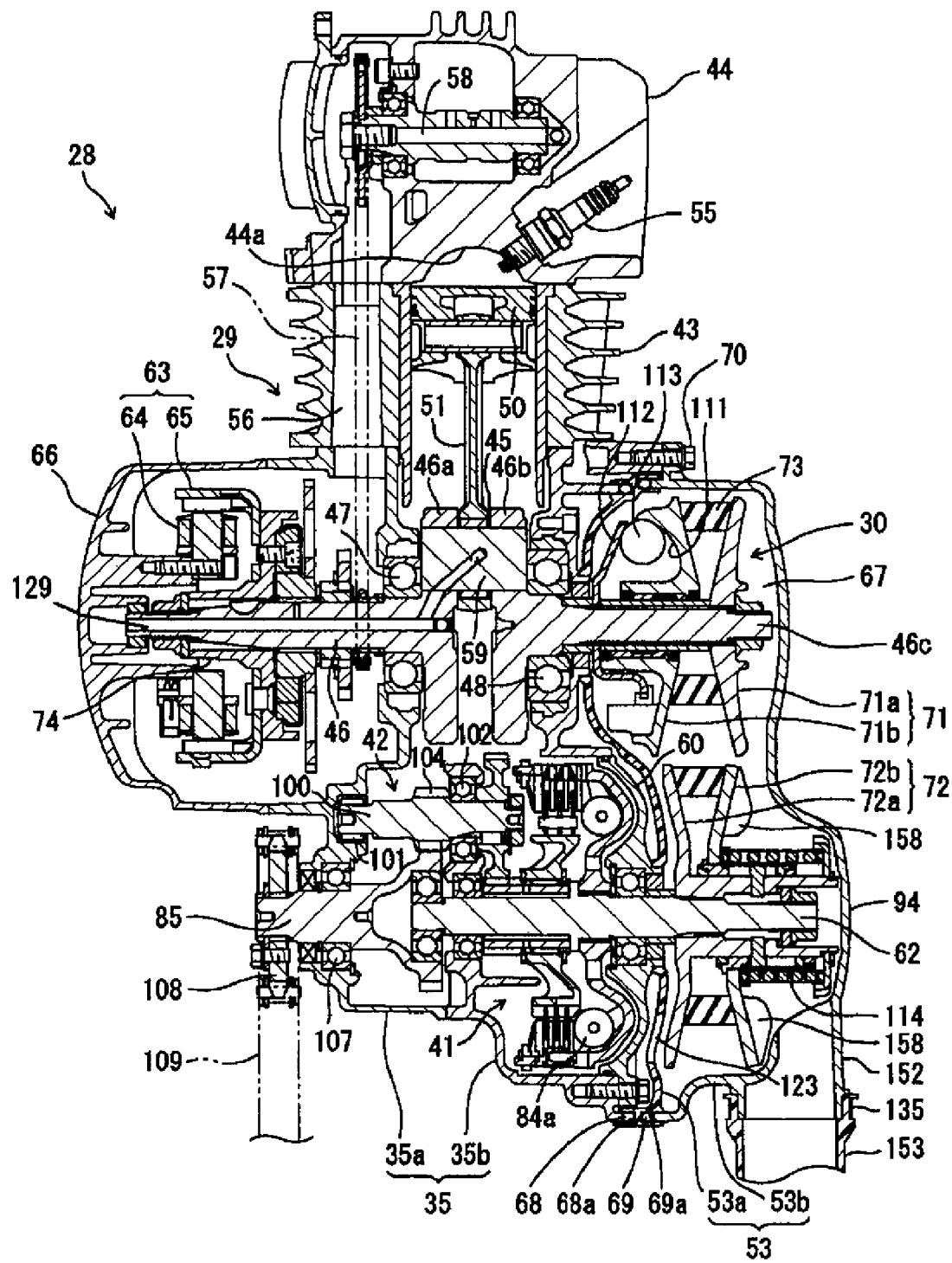
FIG. 8 is a cross-sectional view showing internal structure of the engine unit.

As shown in FIG. 8, a cam chain chamber 56 is formed in a left portion of the cylinder 43 to connect the inside of the crankcase 35 with that of the cylinder head 44. A timing chain 57 arranged in the cam chain chamber 56 is wound around the crankshaft 46 and a camshaft 58. The camshaft 58 rotates in accordance with the rotation of the crankshaft 46, and opens and closes an intake valve and an exhaust valve.

A generator case 66 for housing a generator 63 is detachably attached to the left side of a front half of the first case block 35a. The transmission case 53 for housing the CVT 30 is attached to the right side of the second case block 35b.

An opening is formed on the right side of a rear half of the second case block 35b and is blocked by a clutch cover 60. The clutch cover 60 is detachably fixed to the second case block 35b by a bolt 61 (see FIG. 9).

The transmission case 53 is formed independently from the crankcase 35, and is constituted by an inner case 53a for covering the inner (left) side of the CVT 30 in the vehicle width direction and an outer case 53b for covering the outer (right) side of the CVT 30 in the vehicle width direction. The inner case 53a is attached to the right side of the crankcase 35. The outer case 53b is attached to the right side of the inner case 53a. A belt chamber 67 for housing the CVT 30 is formed inside the inner case 53a and the outer case 53b.

As shown in FIG. 8, the right end of the crankshaft 46 extends through the second case block 35b and the inner case 53a to the belt chamber 67. A primary sheave 71 of the CVT 30 is fitted on the right end of the crankshaft 46. Therefore, the primary sheave 71 rotates in accordance with the rotation of the crankshaft 46. A right portion of the crankshaft 46 (a portion on the right side of the bearing 48) forms a primary sheave shaft 46c.

The left end of the crankshaft 46 extends through the first case block 35a to the inside of the generator case 66. A generator 63 is mounted on the left end of the crankshaft 46. The generator 63 includes a stator 64 and a rotor 65 facing the stator 64. The rotor 65 is fixed to a sleeve 74 that rotates along with the crankshaft 46. The stator 64 is fixed to the generator case 66.

Figure 9:
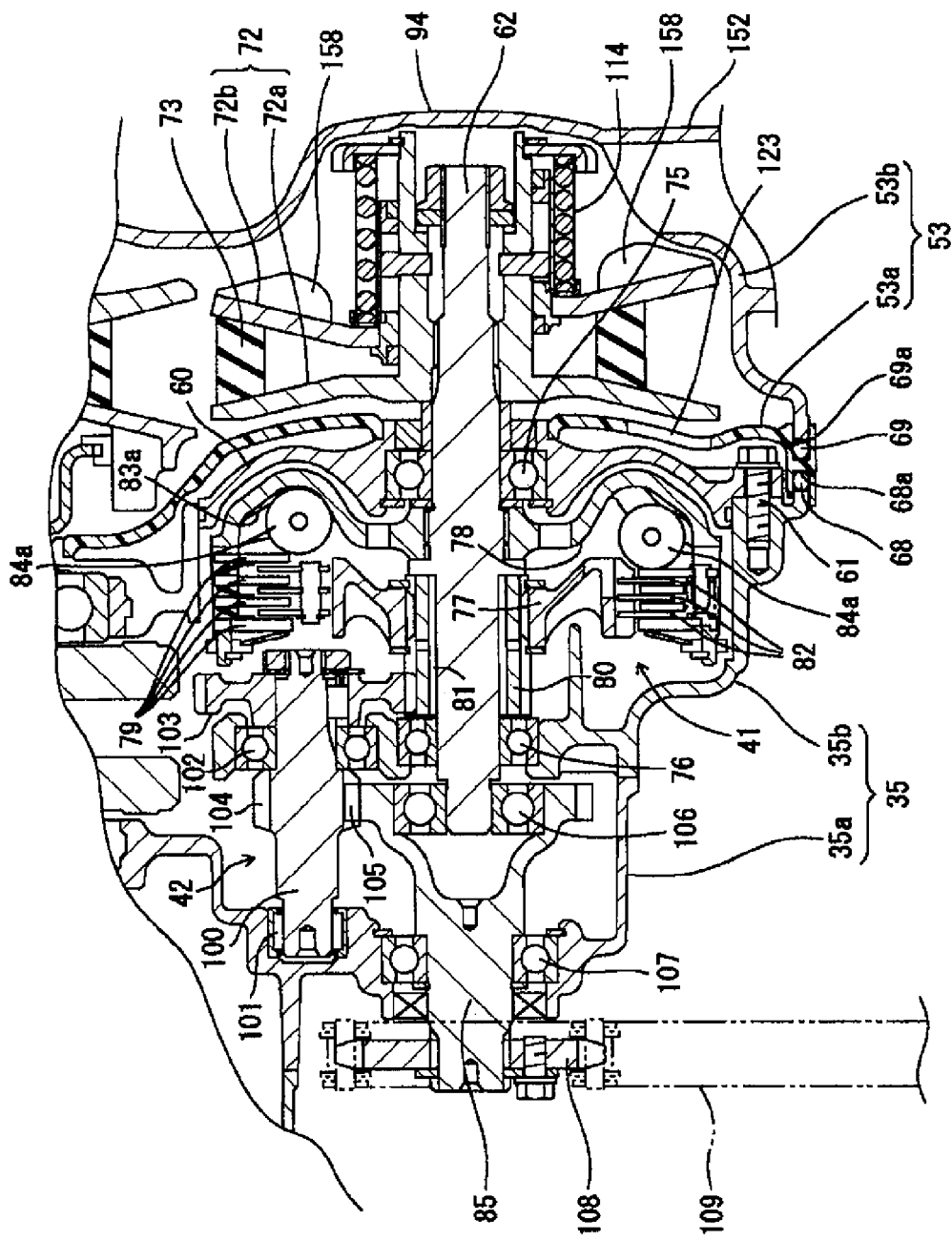
FIG. 9 is a cross-sectional view showing a portion of the internal structure of the engine unit.

A secondary sheave shaft 62 is disposed in parallel with the crankshaft 46 in the rear half of the crankcase 35. As shown in FIG. 9, the secondary sheave shaft 62 is supported in the right side of its midsection by the clutch cover 60 via a bearing 75. The secondary sheave shaft 62 is supported in the left side of its midsection by a left end portion of the second case block 35b via a bearing 76. The right end of the secondary sheave shaft 62 extends through the second case block 35b and the clutch cover 60 to the belt chamber 67. A secondary sheave 72 of the CVT 30 is coupled to the right end of the secondary sheave shaft 62.

As shown in FIG. 8, the CVT 30 includes the primary sheave 71, the secondary sheave 72, and a V-belt 73 that is wound around the primary sheave 71 and the secondary sheave 72. As mentioned above, the primary sheave 71 is mounted on the right portion of the crankshaft 46. The secondary sheave 72 is coupled to the right portion of the secondary sheave shaft 62.

The primary sheave 71 includes a fixed sheave half 71a positioned outside in the vehicle width direction, and a movable sheave half 71b that is positioned inside in the vehicle width direction and faces the fixed sheave half 71a. The fixed sheave half 71a is fixed to the right end of the primary sheave shaft 46c and rotates along with the primary sheave shaft 46c. The movable sheave half 71b is disposed on the left side of the fixed sheave half 71a, and is slidably mounted on the primary sheave shaft 46c. Thus, the movable sheave half 71b rotates along with the primary sheave shaft 46c, and is slidable in an axial direction of the primary sheave shaft 46c. A belt groove is formed between the fixed sheave half 71a and the movable sheave half 71b. A cam surface 111 is formed on the left side of the movable sheave half 71b, and a cam plate 112 is disposed on the left side of the cam surface 111. A roller weight 113 is disposed between the cam surface 111 of the movable sheave half 71b and the cam plate 112.

The secondary sheave 72 includes a fixed sheave half 72a positioned inside in the vehicle width direction, and a movable sheave half 72b that is positioned outside in the vehicle width direction and faces the fixed sheave half 72a. The movable sheave half 72b is mounted on a right end portion of the secondary sheave shaft 62. The movable sheave half 72b rotates along with the secondary sheave shaft 62, and is slidable in the axial direction of the secondary sheave shaft 62. A compressed coil spring 114 is provided on the right end of the secondary sheave shaft 62. The movable sheave half 72b is urged to the left by the compressed coil spring 114. An axis of the fixed sheave half 72a is a cylindrical sliding collar, and is splined to the secondary sheave shaft 62.

A plurality of fan blades 158 is formed on the right side of the movable sheave half 72b of the secondary sheave 72. Blades 158 guide air from the intake duct 153 to the belt chamber 67, and transport air in the belt chamber 67 to the outside. In this embodiment, the blades 158 are, in the side view, formed to extend radially outward in a spiral manner from the center of the movable sheave half 72b.

In the CVT 30, a speed reduction ratio is determined by a magnitude correlation between a force of the roller weight 113 that pushes the movable sheave half 71b of the primary sheave 71 to the right and a force of the compressed coil spring 114 that pushes the movable sheave half 72b of the secondary sheave 72 to the left.

In other words, when the rotational speed of the primary sheave shaft 46c increases, the roller weight 113 is subjected to the centrifugal force and moves radially outward, thereby pushing the movable sheave half 71b to the right. The movable sheave half 71b then moves to the right, and a radius of the belt loop around the primary sheave 71 increases. Subsequently, a radius of the belt loop around the secondary sheave 72 decreases. The movable sheave half 72b of the secondary sheave 72 resists against the urging force of the compressed coil spring 114, and moves rightward. Consequently, while the loop radius of the V-belt 73 around the primary sheave 71 increases, that around the secondary sheave 72 decreases. Thus, the speed reduction ratio becomes smaller.

On the other hand, a reduction in the rotational speed of the primary sheave shaft 46c decreases the centrifugal force exerted on the roller weight 113. Accordingly, the roller weight 113 moves radially inward along the cam surface 111 of the movable sheave half 71b and the cam plate 112. Thus, the force of the roller weight 113 that pushes the movable sheave half 71b to the right decreases. The urging force of the compressed coil spring 114 relatively exceeds the above force, and moves the movable sheave half 72b of the secondary sheave 72 to the left. Accordingly, the movable sheave half 71b of the primary sheave 71 also moves to the left. Consequently, while the radius of the belt loop around the primary sheave 71 decreases, that around the secondary sheave 72 increases. Thus, the speed reduction ratio becomes larger.

As shown in FIG. 8, a bowl-shaped bulge portion 94 that bulges (expands) outward (to the right) in the vehicle width direction is formed in the tip side of the secondary sheave shaft 62 in the outer case 53b. As shown in FIG. 2, a connecting pipe 152 is formed obliquely upward to the rear of the bulge portion 94. Connecting pipe 152 is integrated with the outer case 53b. The air chamber 154 is connected to the connecting pipe 152 via the intake duct 153. Here, no limitation is imposed on the connecting mode between the connecting pipe 152 and the intake duct 153. As shown in FIG. 8, in this embodiment, the connecting pipe 152 and the intake duct 153 are fixed by a band 135.

As shown in FIG. 8, the right end of the connecting pipe 152 is substantially aligned with the right end of the bulge portion 94 in the vehicle width direction. In addition, as shown in FIG. 3, the right end of the air chamber 154 is substantially aligned with the right end of the bulge portion 94 of the transmission case 53. Thus, the connecting pipe 152, the intake duct 153, and the air chamber 154 do not protrude to the outside (right side) of the bulge portion 94. In other words, the intake duct 153 and the air chamber 154 do not protrude to the outside of the transmission case 53. Therefore, despite the fact that the intake duct 153 and the air chamber 154 are provided, the maximum width of the motorcycle 10 is not substantially increased, and the vehicle is downsized in the vehicle width direction.

As shown in FIG. 8, a sealing groove 68a is formed on the left side of the periphery of the inner case 53a. The right-hand periphery of the second case block 35b is received in the sealing groove 68a. An O-ring 68 is inserted in the sealing groove 68a between the inner case 53a and the second case block 35b. In addition, a sealing groove 69a is formed on the right side of the periphery of the inner case 53a. The periphery of the outer case 53b is received in the sealing groove 69a. An O-ring 69 is inserted in the sealing groove 69a between the inner case 53a and the outer case 53b. The outer case 53b and the second case block 35b are fastened by a bolt 70 while holding the inner case 53a therebetween.

Figure 10:
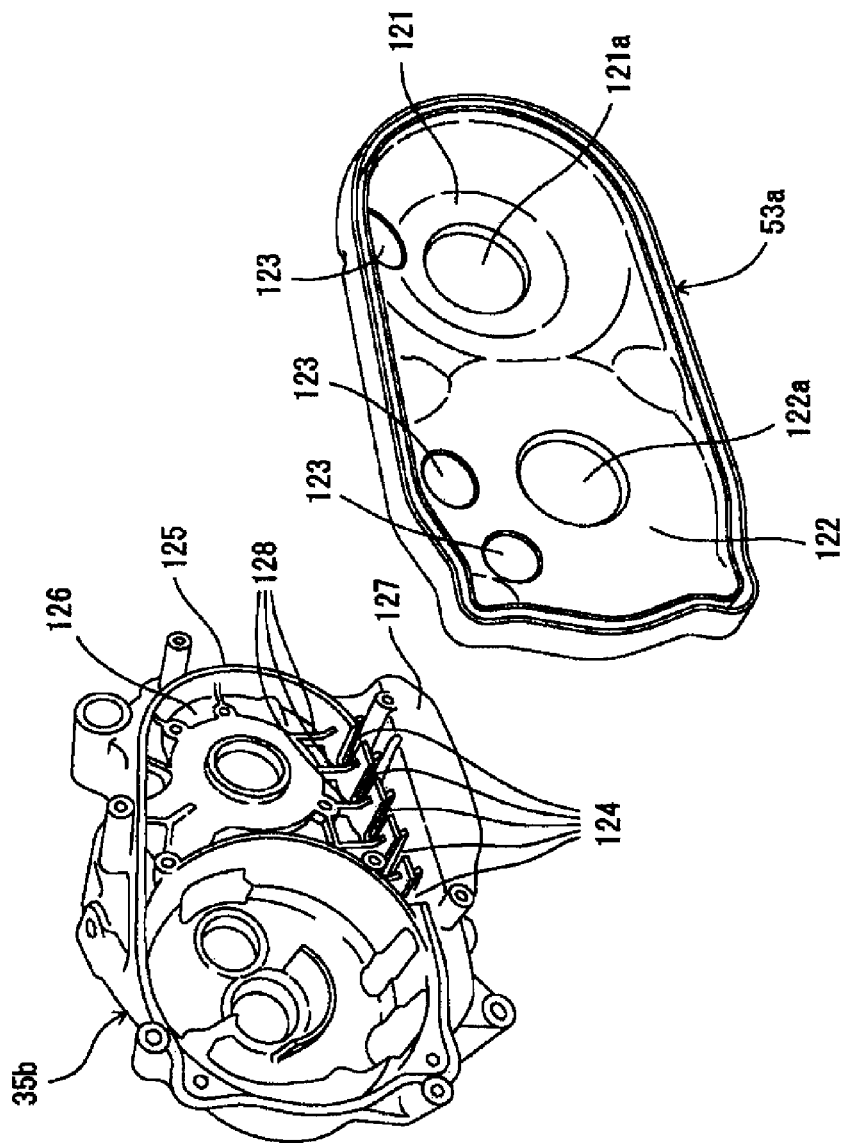
FIG. 10 is an exploded perspective view of a second case block and an inner case of a transmission case.

As shown in FIG. 10, a front half 121 of the inner casing 53a is formed in a bowl shape that bulges leftward. A rear half 122 of the inner casing 53a is formed in a bowl shape that bulges rightward. The front half 121 is formed with a hole 121a through which the primary sheave shaft 46c of the CVT 30 passes. The rear half 122 is formed with a hole 122a through which the secondary sheave shaft 62 of the CVT 30 passes. Here, the clutch cover 60 (see FIG. 8) that is interposed between the inner case 53a and the second case block 35b is omitted in FIG. 10.

A vent hole 123 is provided in the inner case 53a. In this embodiment, the three circular vent holes 123 are formed above the vertical center of the inner case 53a. However, the shape of the vent hole 123 is not limited in any way. In addition, the position of the vent hole 123 is not necessarily limited in an upper portion of the inner case 53a. In the embodiment, the vent holes 123 are provided both in the front half 121 and in the rear half 122 of the inner case 53a. However, the vent holes 123 may only be provided in either the front half 121 or the rear half 122. Furthermore, the number of the vent holes 123 is not particularly limited.

A plurality of vent holes 124 is formed in a right lower portion of the second case block 35b. More specifically, the second case block 35b includes a periphery 125 that is arranged rightward in a standing manner. The periphery 125 has a shape corresponding to the contour of the transmission case 53. The lower side of the periphery 125 is formed into partially-notched slits, that is, of a so-called comb shape. Accordingly, a space 126 defined by the second case block 35b and the inner case 53a is in communication with the outside of the engine unit 28 through the vent holes 124. The right side of the rear half of the second case block 35b is blocked by the clutch cover 60. Therefore, the space 126 in the rear half of the second case block 35b is formed between the clutch cover 60 and the inner case 53a.

Reinforcing ribs 128 are provided on the comb portion of the periphery 125. An oil pan 127 is provided below the vent holes 124.

Figure 11:
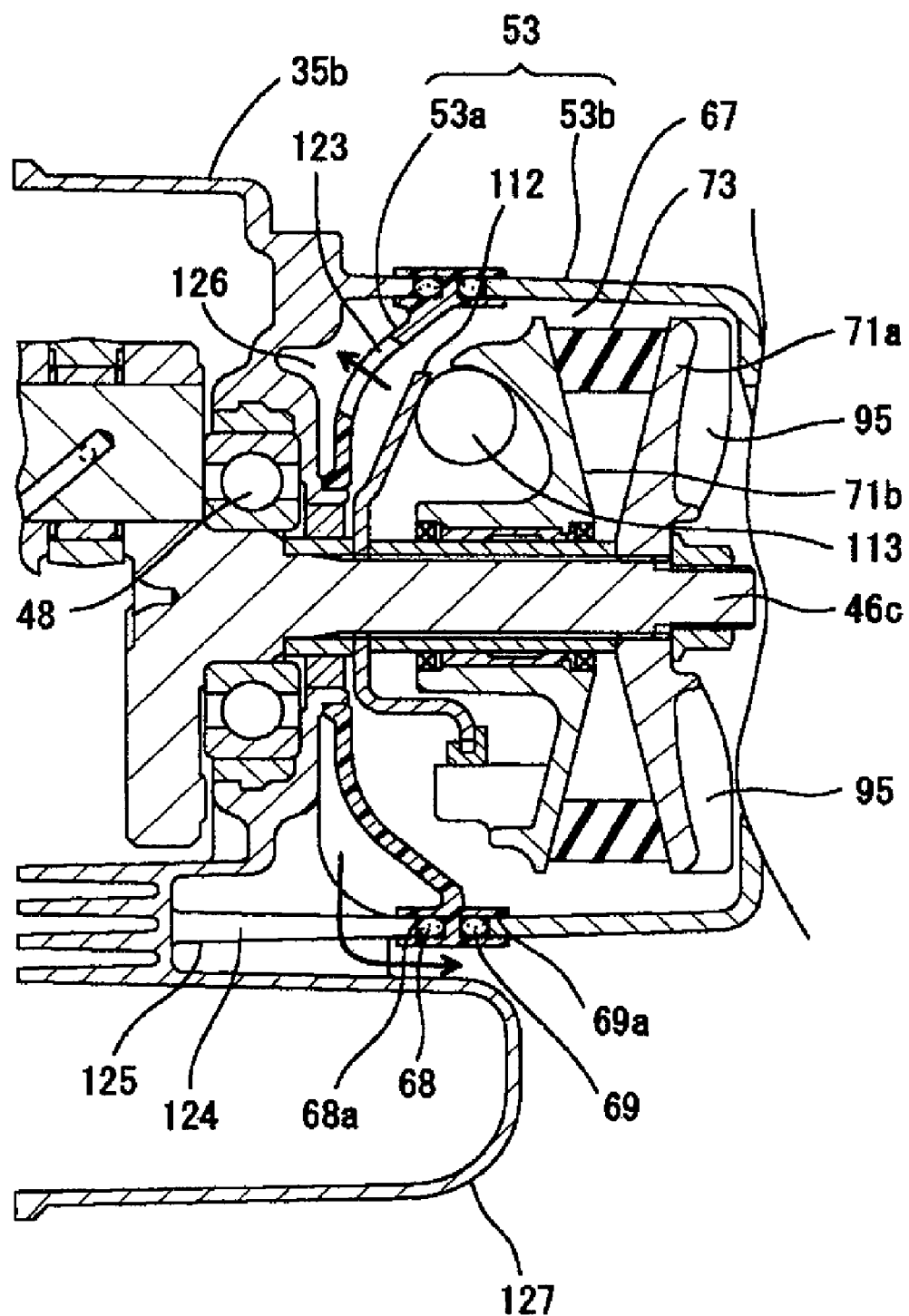
FIG. 11 is a cross-sectional view of the insides of the second case block and the transmission case.

With the above constitution, as shown in FIG. 11, air in the belt chamber 67 is guided into the space 126 through the vent holes 123 of the inner case 53a, and then is discharged to the oil pan 127 through the vent holes 124 of the second case block 35b. As a result, the air is discharged to the outside of the engine unit 28.

As shown in FIG. 9, the centrifugal clutch 41 is mounted on the left portion of the secondary sheave shaft 62. The centrifugal clutch 41 is a wet-type multiplate clutch, and includes a generally cylindrical clutch housing 78 and a clutch boss 77. The clutch housing 78 is splined to the secondary sheave shaft 62, and rotates along with the secondary sheave shaft 62. A plurality of ring-shaped clutch plates 79 is attached to the clutch housing 78. The clutch plates 79 are aligned at intervals in an axial direction of the secondary sheave shaft 62.

A cylindrical gear 80 is rotatably fitted on the periphery of the left portion of the secondary sheave shaft 62 via a bearing 81. The clutch boss 77 is disposed radially inward of the clutch plates 79 and radially outward of the gear 80, and is meshed with the gear 80. Thus, the gear 80 rotates along with the clutch boss 77. A plurality of ring-shaped friction plates 82 is mounted radially outward of the clutch boss 77. Friction plates 82 are aligned at intervals in the axial direction of the secondary sheave shaft 62. Each of the friction plates 82 is placed between the adjacent clutch plates 79.

A plurality of cam surfaces 83a is formed on the left side of the clutch housing 78. A roller weight 84 is disposed between the cam surfaces 83a and the rightmost clutch plate 79 that faces the cam surfaces 83a.

In centrifugal clutch 41, a clutch-in (engaged) state and a clutch-off (disengaged) state are automatically switched in accordance with the magnitude of the centrifugal force exerted on the roller weight 84a.

More specifically, when the clutch housing 78 rotates at a speed equal to or higher than a given speed, the roller weight 84a is moved radially outward by a centrifugal force, thereby pushing the clutch plates 79 to the left. Consequently, the clutch plates 79 and the friction discs 82 are pressed against each other to bring the centrifugal clutch 41 into the clutch-in state where a driving force of the secondary sheave shaft 62 is transmitted to an output shaft 85 via the centrifugal clutch 41.

On the other hand, when the clutch housing 78 rotates below the given speed, the centrifugal force exerted on the roller weight 84a decreases, and thus, the roller weight 84a moves radially inward. Consequently, the clutch plates 79 and the friction plates 82 are released from each other to bring the centrifugal clutch 41 into the clutch-off state where the driving force of the secondary sheave shaft 62 is not transmitted to the output shaft 85. In FIG. 9, the front side of the centrifugal clutch 41 (the upper side in FIG. 9) shows the clutch-off state while the rear side thereof (the lower side in FIG. 9) shows the clutch-in state.

The deceleration mechanism 42 is interposed between the centrifugal clutch 41 and the output shaft 85. The deceleration mechanism 42 has a speed-change shaft 100 disposed in parallel with the secondary sheave shaft 62 and the output shaft 85. The speed-change shaft 100 is rotatably supported by the first case block 35a via a bearing 101, and is also supported by the second case block 35b via a bearing 102. A first speed-change gear 103 that meshes with the gear 80 is provided on a right end portion of the speed-change shaft 100.

A second speed-change gear 104 with a smaller radius than the first speed-change gear 103 is provided on a midsection of the speed-change shaft 100. A third speed-change gear 105 that meshes with the second speed-change gear 104 is formed on the outer periphery of a right end portion of the output shaft 85. The inner periphery of the right end portion of the output shaft 85 is supported by the left end portion of the secondary sheave 62 via a bearing 106. Due to the above constitution, the output shaft 85 is rotatably supported by the secondary sheave shaft 62 via the bearing 106, and is coaxially (linearly) arranged with the secondary sheave shaft 62. In addition, a midsection of the output shaft 85 is supported by the left end portion of the second case block 35b via a bearing 107.

With the constitution described above, the clutch boss 77 and the output shaft 85 are coupled together through the gear 80, the first speed-change gear 103, the speed-change shaft 100, the second speed-change gear 104, and the third speed-change gear 105. Thus, the output shaft 85 rotates in accordance with the rotation of the clutch boss 77.

A left end portion of the output shaft 85 passes through the first case block 35a, and protrudes outward of the crankcase 35. A drive sprocket 108 is fixed to the left end portion of the output shaft 85. A chain 109 is wound around the drive sprocket 108, and serves as a power transmission mechanism to transmit the drive force of the output shaft 85 to the rear wheel 26. The power transmission mechanism is not limited to the chain 109 but can be a transmission belt, a gear mechanism with a plurality of combined gears, a drive shaft, or other members.

A mechanism to supply lubricating oil to the secondary sheave shaft 62 is now described with reference to FIGS. 5 and 8. As shown in FIG. 5, the oil pan 127 for storing lubricating oil is formed in a bottom portion of the crankcase 35.

Lubricating oil stored in the oil pan 127 is supplied to a connection 45 between the crankshaft 46 and the connecting rod 51 by an oil pump 130 as a lubricating-oil supply mechanism that is disposed on the oil pan 127 in the crankcase 35. More specifically, lubricating oil drawn by the oil pump 130 is guided to one or more generally-circular oil supply passages 129 in a plan view that open to a left end surface of the crankshaft 46, and then is supplied to the connection 45 through the oil supply passages 129.

Lubricating oil supplied to the connection 45 is splashed therefrom in association with rotation of the crankshaft 46. Lubricating oil splashed in association with rotation of the crankshaft 46 is guided to the inside of the centrifugal clutch 41.

Lubricating oil introduced to the inside of the centrifugal clutch 41 is supplied to the secondary sheave shaft 62. Then, the lubricating oil returns to the oil pan 127 from an oil drain hole 131 that is provided below and slightly at the rear of the second case block 35b.

Figure 12:
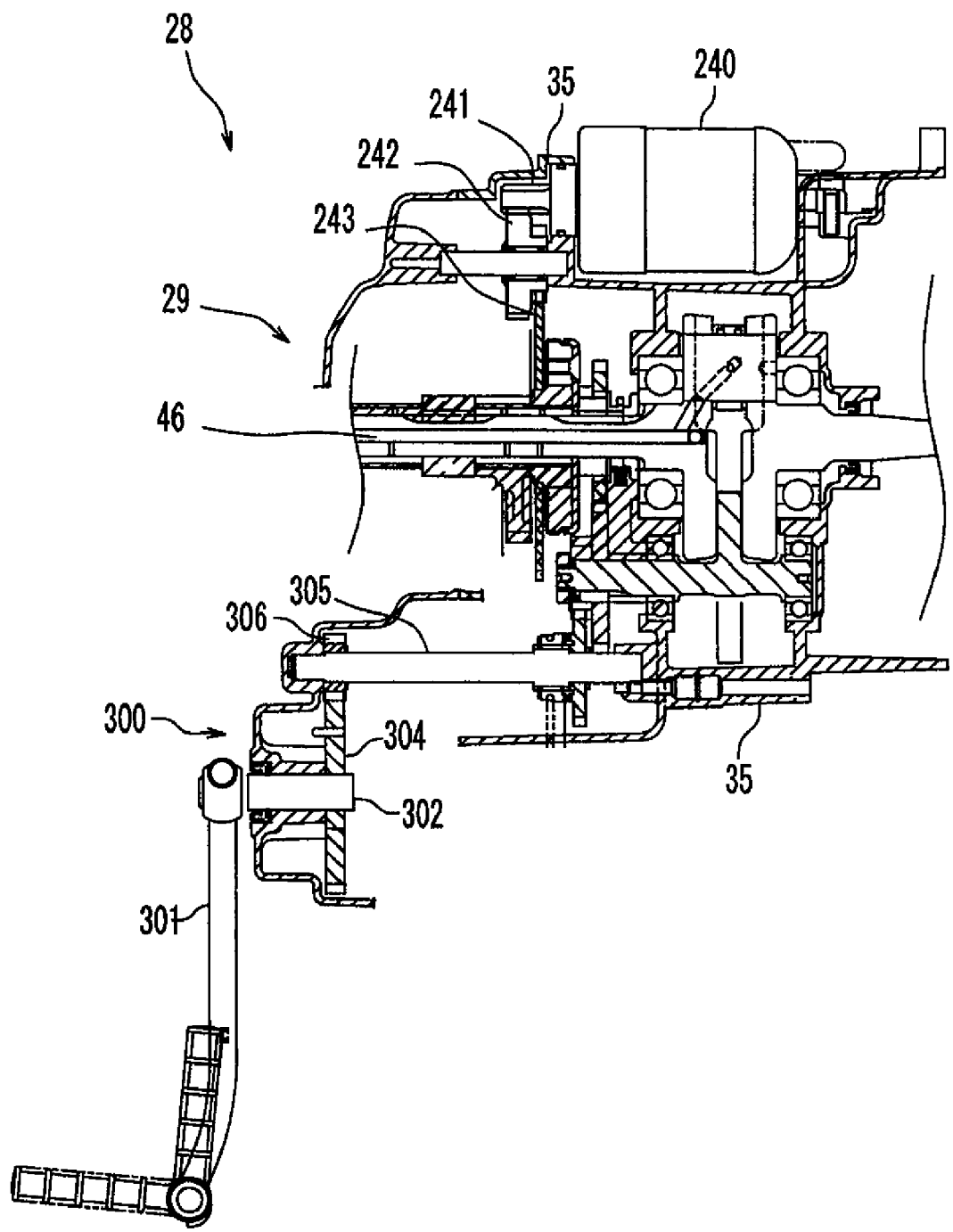
FIG. 12 is a cross-sectional view showing a portion of the internal structure of the engine unit.

A starting system of the engine 29 is now described. FIG. 12 is a partial sectional view of the engine unit 28 that is equipped with a kick starter 300 and an electric starter 240. A rider of the motorcycle 10 can start the engine 29 by operating the kick starter 300.

The kick starter 300 has a kick pedal 301. The kick pedal 301 is attached to a kick shaft 302 provided with a gear 304. Meanwhile, a gear 306 is rotatably provided on a shaft 305. The gear 304 meshes with the gear 306. Rotation of the kick shaft 302 is transmitted to the crankshaft 46 via the gear 304 and the like. The position of the kick pedal 301 is not limited to either the right or the left of the motorcycle 10. In addition, the longitudinal or vertical position of the kick pedal 301 with respect to the crankshaft 46 is not particularly limited. The kick pedal 301 is placed in a position where it can be actuated as described above.

The electric starter 240 of the engine unit 28 is attached to the crankcase 35. Rotation of the electric starter 240 is transmitted to the crankshaft 46 via gears 241, 242, 243. With the above constitution, the electric starter 240 is activated by the rider's operation of a starter switch 140a, and then the engine 29 starts.

Figure 13:
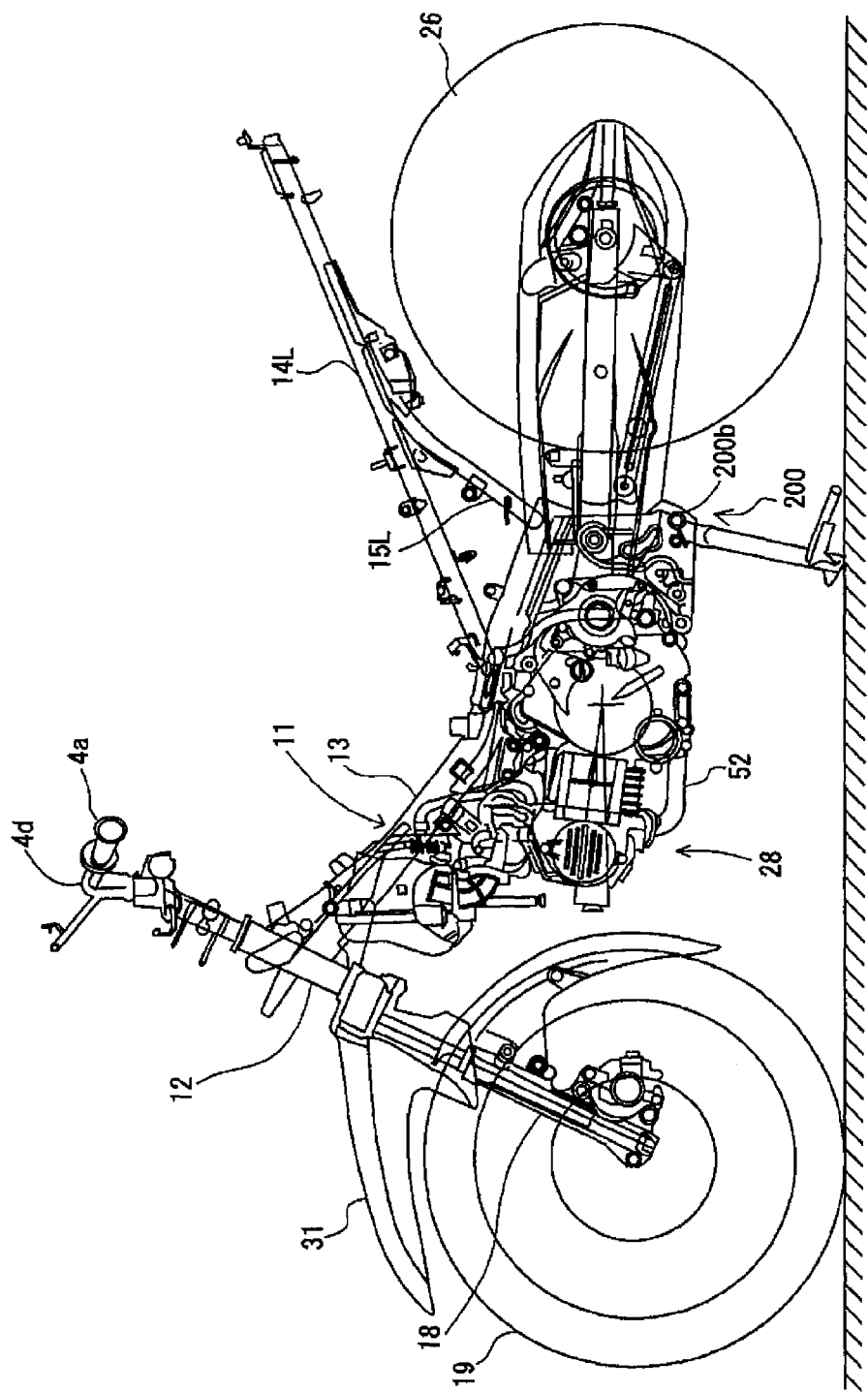
FIG. 13 is a side view of the motorcycle according to the embodiment with a cover being removed, and shows an upright state of a main stand.
Figure 14:
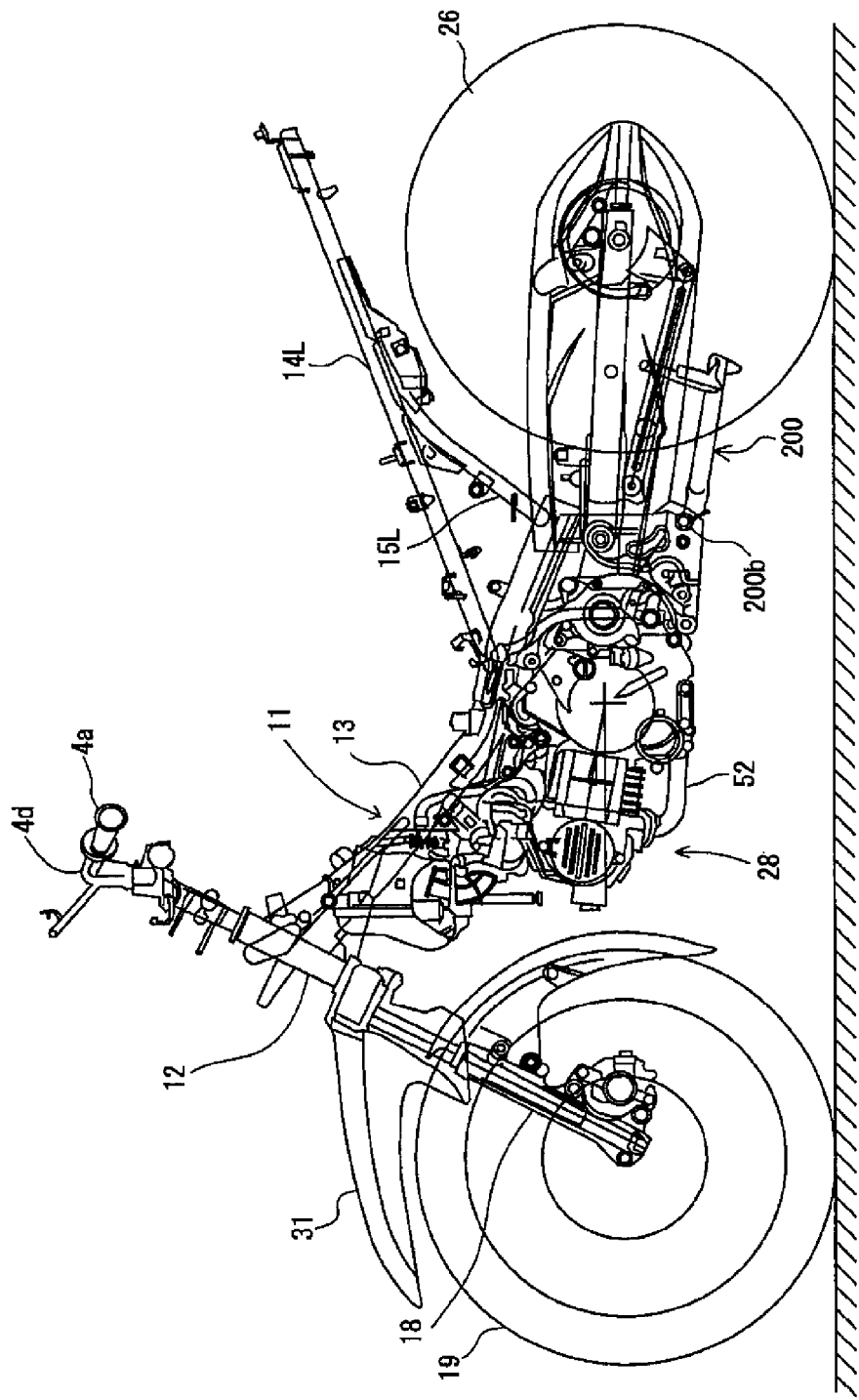
FIG. 14 is a side view of the motorcycle according to the embodiment with the cover being removed, and shows a stored state of the main stand.
Figure 15:
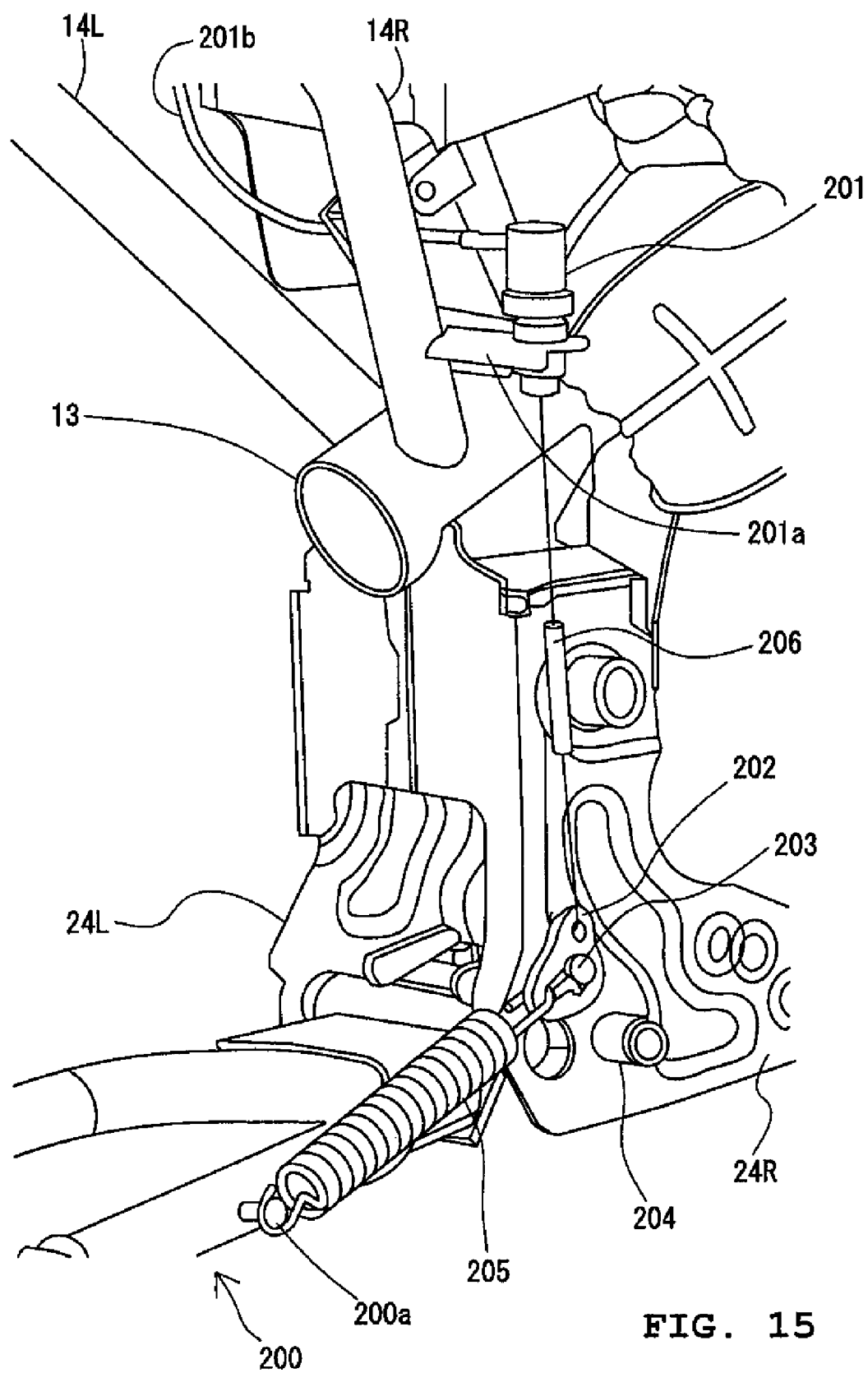
FIG. 15 is a exploded perspective view of a body frame showing a main stand switch according to the embodiment.

A main stand 200 of the motorcycle 10 is now described. As shown in FIGS. 13 and 14, which shows the motorcycle 10 with members such as the body cover 10 removed, the main stand 200 is attached to the motorcycle 10. FIG. 13 shows an upright state of the main stand 200 where the rear wheel 26 is lifted off a road surface. FIG. 14 shows a stored state of the main stand 200 where the rear wheel 26 contacts the road surface. The main stand 200 swings in a given range between the upright and stored states. The main stand 200 is mounted to swing about a pivot 200b. In addition, as shown in FIG. 15, a pivot shaft 204 is pivotally supported by the rear arm brackets 24L, 24R. The pivot shaft 204 is rotatable about an axis. The actuation of the main stand 200 into the upright or stored state interlocks with the rotation of the pivot shaft 204.

The main stand 200 is provided with a pin 200a. In addition, the rear arm bracket 24R is provided with a pin 203. A coupling plate 202 is attached to the pin 203. A main stand switch 201 is attached to the body frame 11 (see FIG. 1) via a bracket 201a. The position where the main stand switch 201 is attached is not particularly limited in the motorcycle 10 and can be anywhere on the body frame 11. In this embodiment, the bracket 201a is provided on a portion of the seat rail 14R. The main stand switch 201 is connected by a control unit 162, which is not shown in FIG. 15, and a lead wire 201b. The main stand switch 201 and the coupling plate 202 are connected to each other via a connecting body 206. The connecting body 206 is not limited to a specific configuration and may be a wire or a rod-shaped member, for example. An elastic body 205 is supported by the pin 200a and the coupling plate 202. As shown in FIG. 15, a stored state of the main stand 200 is retained by urging force of the elastic member 205 in a stretching and contracting direction. Although not shown, an upright state of the main stand 200 is retained by the urging force of the elastic member 205 in the stretching and contracting direction. In this embodiment, a coil spring is employed for the elastic body 205. However, the elastic body 205 can take any configuration as long as it functions to retain the upright and stored states.

The main stand switch 201 is actuated when being pulled by the connecting body 206. In other words, as shown in FIG. 15, when the main stand 200 is in the stored state, the connecting body 206 is not pulled downward. At this time, the main stand switch 201 is turned on by an internal mechanism of the main stand switch 201. In addition, as shown in FIG. 13, when the main stand 200 is in the upright state, the main stand switch 201 moves the connecting body 206 downward for a given distance by the configuration of the coupling plate 202 (see FIG. 15). At this time, the main stand switch 201 is brought into an off state where the switch is not actuated. When the main stand switch 201 is in the on state, the main stand switch 201 is in an energized state where a main stand SW signal 174 is detectable. When the main stand switch 201 is in the off state, the main stand switch 201 is in a de-energized state where the main stand SW signal 174 is not detectable.

Figure 16:
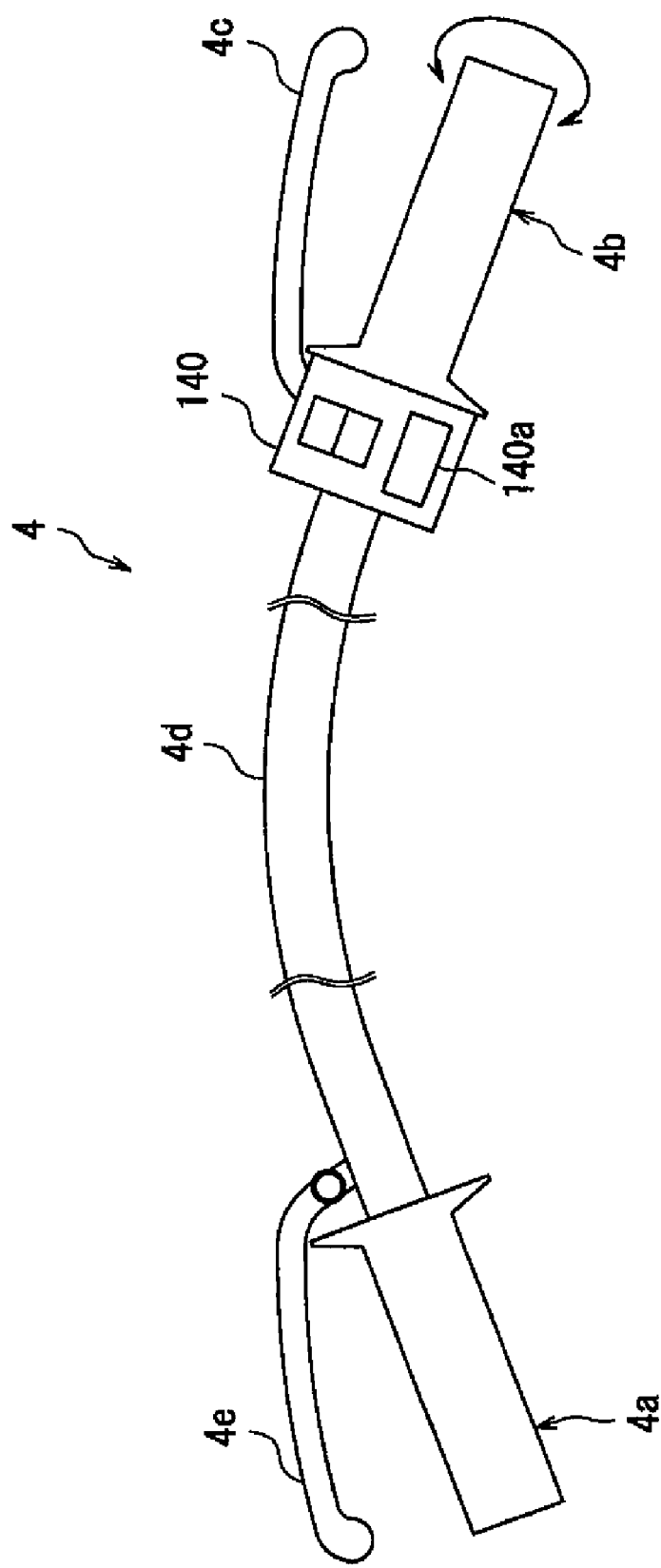
FIG. 16 is a schematic structural view of a steering handle portion.

A brake system and the like of the motorcycle 10 is now described. FIG. 16 is a schematic structural view of a steering handle 4. The steering handle 4 includes a handlebar 4d that is connected to the steering head pipe, a left grip 4a positioned at the left end of the handlebar 4d and a right grip 4b positioned at the right end of the handlebar 4d. The right grip 4b can be rotated about the handlebar 4d. When the rider rotates the right grip 4b, a throttle is operated to control a throttle opening of the engine 29.

A brake lever 4c is disposed adjacent to the right grip 4b. A brake lever 4e is disposed adjacent to the left grip 4a. The operation of the brake lever 4c or the brake lever 4e by the rider activates a brake of the motorcycle 1. In this embodiment, a front brake 401 is actuated by operation of the brake lever 4c and a rear brake 402 is actuated by operation of the brake lever 4e. However, the front brake 401 may be actuated by operation of the brake lever 4e, and the rear brake 402 may be actuated by operation of the brake lever 4c.

A switch box 140 is disposed on the left side of the right grip 4b. A starter switch 140a is disposed in the switch box 140. As will be described later, the control unit 162 receives a starter SW signal by the rider's operation of the starter switch 140a. The control unit 162 activates the electric starter 240 based on the starter SW signal.

Figure 17A:
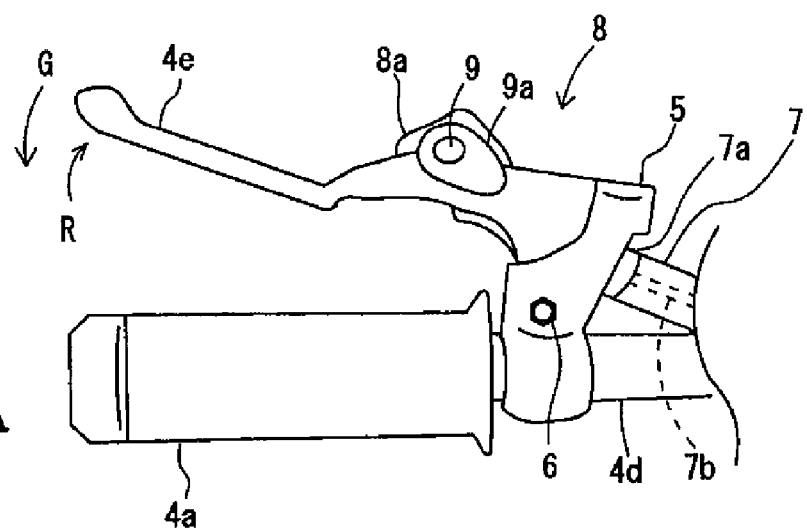
FIGS. 17A-17C show a portion of a left handlebar.
Figure 17B:
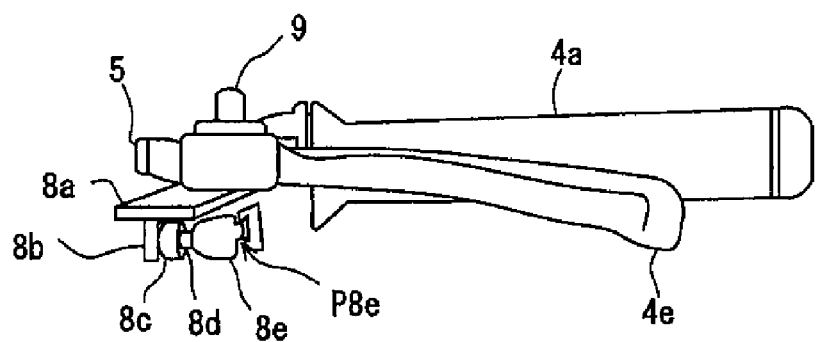
Figure 17C:
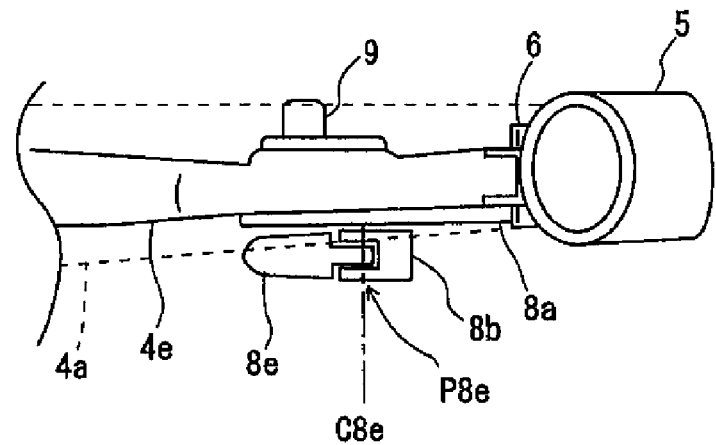

A left handle section including the brake lever 4e is now described in detail. As shown in FIG. 17, an arm 5 is fixed to the handlebar 4d. The brake lever 4e is attached to the arm 5 by a bolt 6. The brake lever 4e pivots about a position where the bolt 6 is fastened in a direction G or R. The brake lever 4e pivots in the direction G or R within a given range. In addition, a cable 7 is attached to the arm 5 via an attachment 7a. A wire 7b runs inside the cable 7. When the brake lever 4e pivots in the direction G, the wire 7b in the cable 7 is pulled to actuate the rear brake 402.

The actuation of the rear wheel brake 402 is not limited to wire 7b. For example, a brake mechanism actuated by hydraulic pressure may be used. In such a case, the motorcycle includes a master cylinder in which liquid is filled and a member such as a tube from which liquid flows to the master cylinder. This is also applicable to actuation of the front wheel brake 401 by hydraulic pressure. In this embodiment, actuation of the front brake 401 is not particularly limited and description of the actuation of the front brake 401 is thus omitted.

Figure 18A:
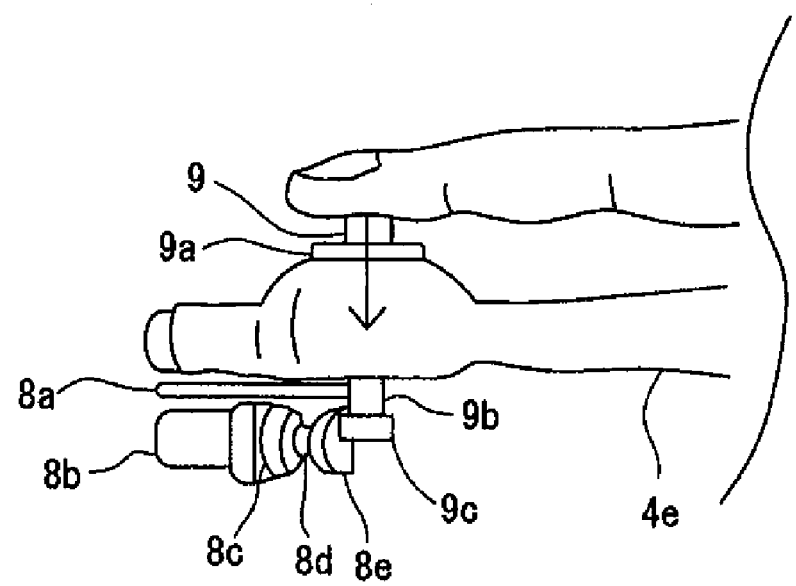
FIGS. 18A and 18B show a portion of the left handlebar and a state that a brake lock interlock switch is temporarily secured.

A hinge lever 8e pushes a switch lever 8d by the actuation of a pin 9. First, the rider pulls the brake lever 4e in the direction G in FIG. 17A. The brake lever 4e pivots about the bolt 6 in the direction G in FIG. 17A, and approaches the left grip 4a. When the brake lever 4e pivots in the direction G to a given position, the pin 9 can be actuated. When the brake lever 4e is in the range that the pin 9 can be actuated, the rider pushes down the pin 9 as shown in FIG. 18A. A finger or a hand can be used to push down the pin 9. When the pin 9 is pushed down, a shaft 9b and a flange 9c under the pin 9 are pushed out by the brake lever 4e. When the pin 9 is pushed down until the flange 9c is positioned below a support plate 8a, the rider releases a load that is applied to the brake lever 4e. The brake lever 4e then pivots in the direction R, but does not return to the original position. At this time, the brake lever 4e is temporarily fixed in a given position with respect to the left grip 4a, and the pin 9 is temporarily fixed in a given position where the flange 9c abuts on the hinge lever 8e. The temporary fixation of the pin 9 is cancelled by rotating the brake lever 4e in the direction G from the current position where the pin 9 is temporarily fixed.

Figure 18B:
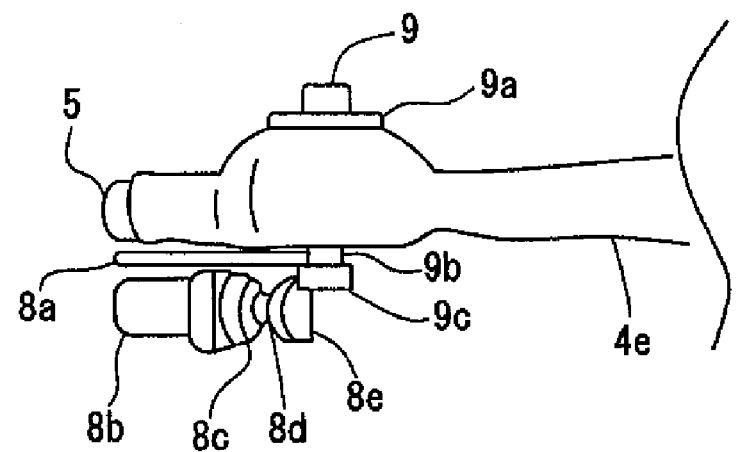

FIG. 18B shows a position where the brake lever 4e and the pin 9 are temporarily fixed. In this position, the flange 9c is stuck on the support plate 8a, and thus, the pin 9 is temporarily fixed. In addition, the flange 9c pushes the hinge lever 8e from the right side to the left side of FIG. 18B. Consequently, a portion of the switch lever 8d is buried in a switch case 8b.

With the switch lever 8d partially buried in the switch case 8b, an internal mechanism of the switch case 8b actuates a brake lock switch 802a. As will be described later, the control unit 162 receives a brake lock SW signal based on the actuation of the brake lock switch 802a. In addition, a brake switch 801a is turned on when the brake lever 4e is pulled within the given range in the direction G. The brake switch 801a is actuated by the internal mechanism of the switch case 8b. As will be described later, the control unit 162 receives a brake SW signal based on the actuation of the brake switch 801a. In addition, the control unit 162 receives the brake SW signal by the rider's operation of the brake lever 4c. Based on the brake lock SW signal, the control unit 162 controls start-up of the engine 29, speed regulation of the engine 29, and inhibition of the operation of the engine 29.

Figure 19:
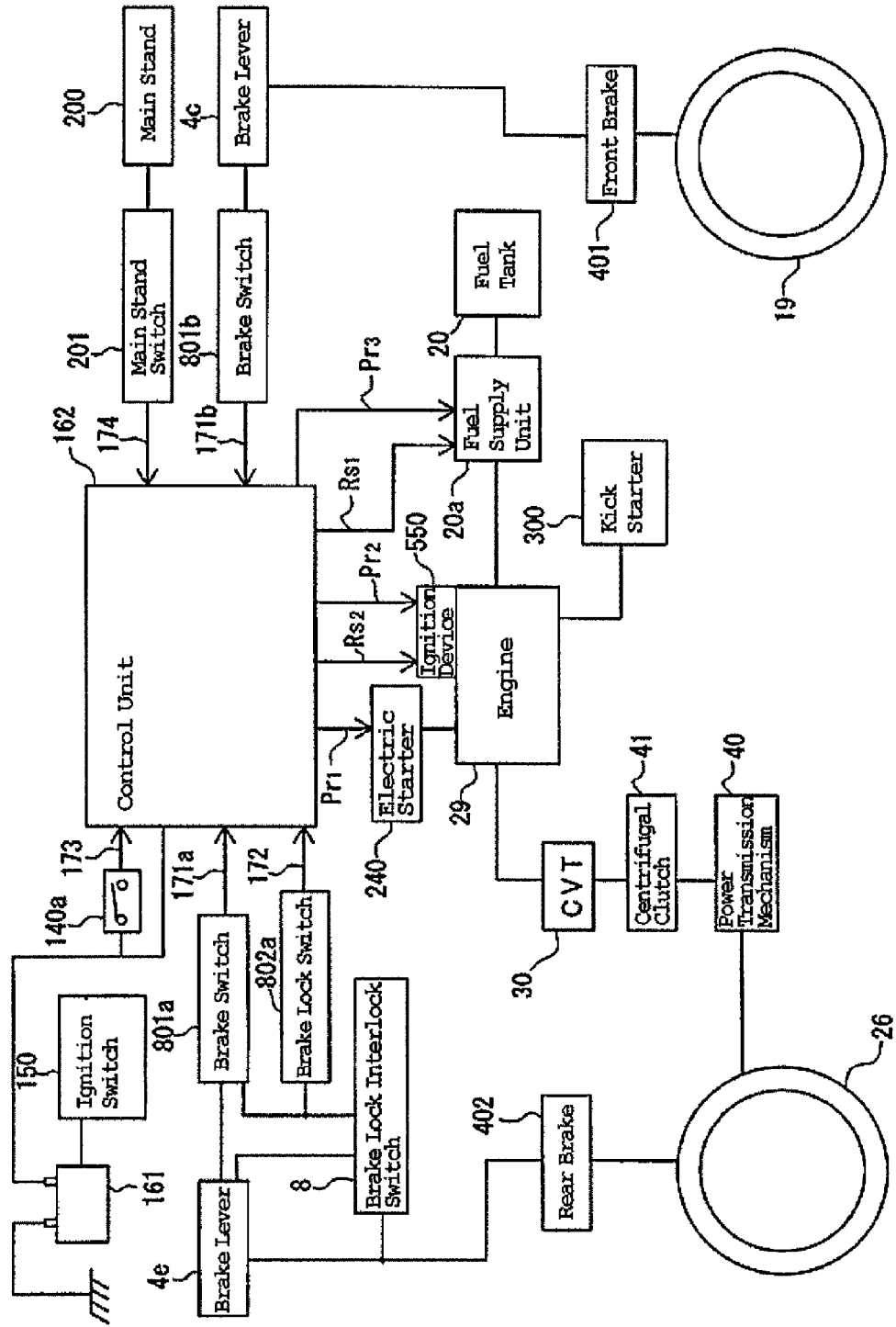
FIG. 19 is a control system diagram of the motorcycle according to the embodiment.

As shown in FIG. 19, the motorcycle 10 includes a main power source 161 connected to the control unit 162. When the rider brings the main power source 161 into an on state (power-on), the control unit 162 is actuated. As described above, the control unit 162 receives a brake SW signal 171a from the brake switch 801a. The control unit 162 receives a brake SW signal 171b based on the operation of the brake lever 4c. The control unit 162 also receives a brake lock SW signal 172 based on the operation of the brake lever 4e. In addition, the control unit 162 receives a starter SW signal 173 based on the operation of the starter switch 140a. The control unit 162 receives a main stand SW signal 174 based on the actuation of the main stand 200.

The control unit 162 activates the electric starter 240 based on the starter SW signal 173. The engine 29 is started by the activation of the electric starter 240. The engine 29 can also be started by the kick starter 300. In this embodiment, the engine 29 is started either by a starter method including the starter switch 140a and the electric starter 240 or by the kick starter 300. However, the engine 29 may be started only by the kick starter 300 or only by the starter method.

With the start-up of the engine, rotation of the engine 29 is transmitted to the CVT 30. Rotation of the engine 29 is further transmitted to the centrifugal clutch 41 by actuation of the CVT 30. As described above, the centrifugal clutch 41 intermittently transmits the rotation of the engine 29 based on the rotational speed of the secondary sheave shaft 62. Thus, the centrifugal clutch 41 transmits rotation of the secondary sheave shaft 62 to a power transmission mechanism 40 when the rotational speed of the secondary sheave shaft 62 equals or exceeds a given speed. The rear wheel 26 rotates by actuation of the power transmission mechanism 40. The motorcycle 10 travels on the basis of rotation of the rear wheel 26.

The configurations of the front brake 401 and the rear brake 402 are not particularly limited. The front brake 401 and the rear brake 402 may be disc brakes including a disc rotor and brake pads. Alternatively, the front brake 401 and the rear brake 402 may be drum brakes including a brake drum. Moreover, the front brake 401 and the rear brake 402 may employ different types of brake systems from each other. There is no limitation imposed on the configurations of the front brake 401 and the rear brake 402 as long as the friction between the road surface and the front wheel 19 and the friction between the road surface and the rear wheel 26 increase when the brakes are actuated during travel of the motorcycle 10.

Rotation of the rear wheel 26 is regulated by the rear brake 402 and rotation of the front wheel 19 is regulated by the front brake 401. The rear brake 402 does not make contact with the front wheel 19 while the motorcycle 10 is running; however, there is a case that actuation of the rear brake 402 increases the friction between the front wheel 19 and the road surface. Similarly, the front brake 401 does not make contact with the rear wheel 26; however, there is a case that actuation of the front brake 401 increases the friction between the rear wheel 26 and the road surface. Thus, the motorcycle 10 can come to rest only by actuation of the rear brake 402. In addition, the motorcycle 10 can come to rest only by actuation of the front brake 401.

The front brake 401 is actuated on the basis of operation of the brake lever 4c, and the rear brake 402 is actuated on the basis of operation of the brake lever 4e. A brake switch 801b is actuated on the basis of operation of the brake lever 4c, and the brake switch 801a is actuated on the basis of operation of the brake lever 4e. The control unit 162 receives the brake SW signal 171b by actuation of the brake switch 801b. The control unit 162 receives the brake SW signal 171a by actuation of the brake switch 801a. As described above, the brake lock switch 802a is actuated on the basis of actuation of the brake lever 4e. The control unit 162 receives the brake lock SW signal 172 on the basis of actuation of the brake lock switch 802a. Operation of the brake lever 4e and the pin 9 in a brake lock interlock switch 8 brings the rear brake 402 into a continuously actuated state. This can be made possible by the temporary fixation of the brake lever 4e in the given position with respect to the left grip 4a.

The control unit 162 executes engine speed regulation control Rs, engine start inhibition control Pr, and engine operation inhibition control Pe with the brake SW signal 171a, the brake SW signal 171b, the brake lock SW signal 172, the starter SW signal 173, and the main stand SW signal 174. In the engine speed regulation control Rs, the control unit 162 regulates the speed of the engine 29 based on each of the signals input in the control unit 162. In the engine start inhibition control Pr, the control unit 162 inhibits the start-up of the engine 29 based on each of the signals input in the control unit 162. In the engine operation inhibition control Pe, the control unit 162 terminates the operation of the engine 29 based on each of the signals input in the control unit 162. Engine speed regulation control Rs, engine start inhibition control Pr, and engine operation inhibition control Pe are now described with reference to the drawings.

Figure 20:
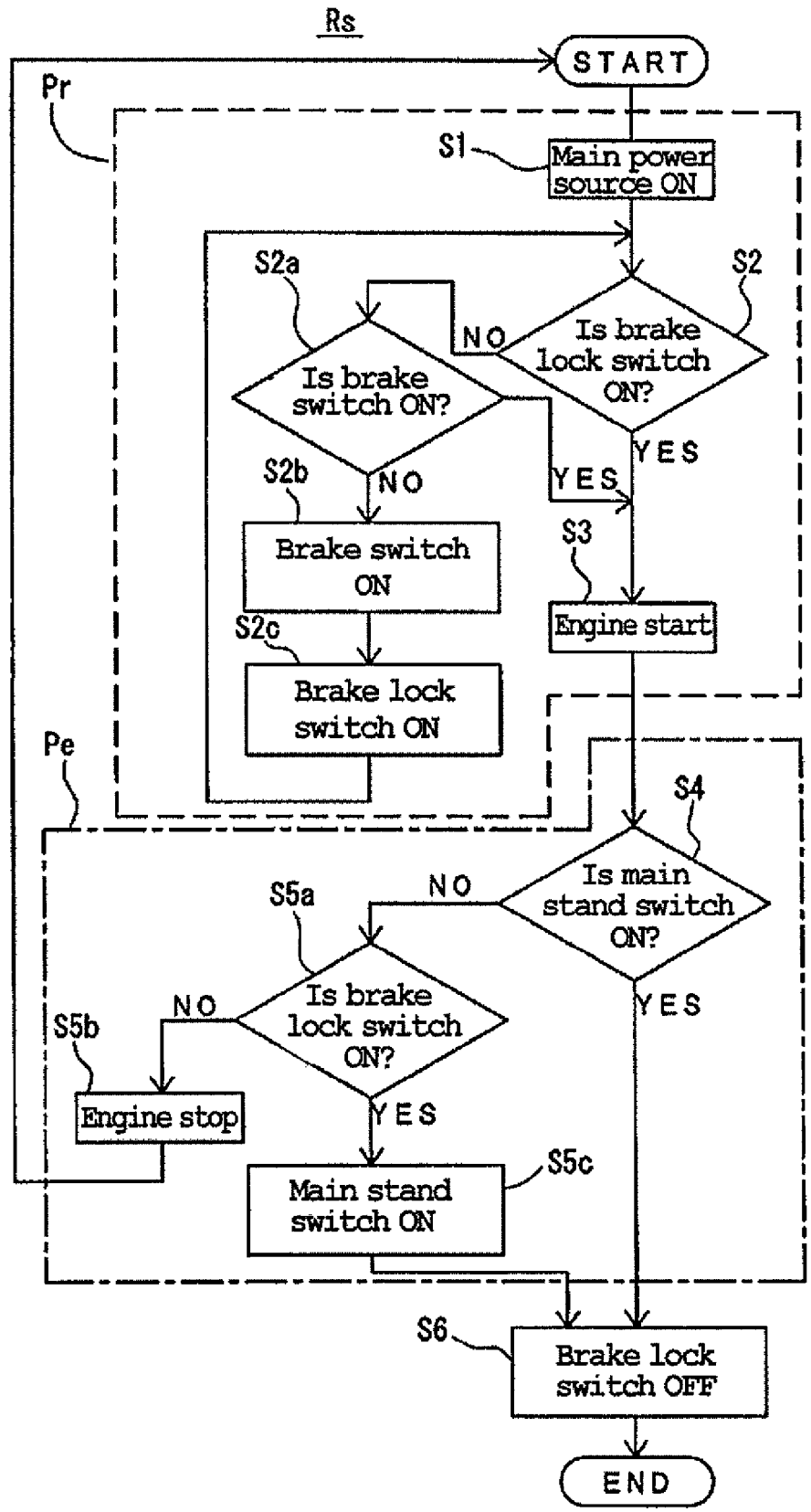
FIG. 20 is a flow chart showing engine speed regulation control, engine start inhibition control, and engine operation inhibition control according to the embodiment.

FIG. 20 is a flow chart of the engine speed regulation control Rs, the engine start inhibition control Pr, and the engine operation inhibition control Pe. The main power source 161 is turned on in step SI when the rider operates an ignition switch 150. The ignition switch 150 is placed on the outer surface of the body cover 21 (see FIG. 1), for example.

In step S2, the brake lock switch 802a is actuated, and it is determined whether or not it is in an on state. The brake lock switch 802a may be actuated to be in the on state before the main power source 161 is turned on. Alternatively, the brake lock switch 802a may be actuated to be in the on state after step S1. If the brake lock switch 802a is in the on state, the process goes to step S3. If the brake lock switch 802a is not in the on state, the process goes to step S2a. When the main power source 161 and the brake lock switch 802a are both in the on state, a brake lock indicator Lr (not shown) lights up in a meter display 151. When the main power source 161 is in the on state, but the brake lock switch 802a is in an off state, the brake lock indicator Lr (not shown) flashes in the meter display 151. The meter display 151 is disposed on an upper surface of a front mask 33a (see FIG. 1), for example.

In step S2a, the brake switch 801a is actuated, and it is determined whether or not it is in the on state. Alternatively, the brake switch 801b is actuated, and is determined whether or not it is in the on state. If the brake switch 801a or 801b is in the on state, the process goes to step S3. If neither the brake switch 801a nor 801b is in the on state, the process goes to step S2b. If the brake switch 801a is actuated to be in the on state in step S2a, the control unit 162 receives the brake SW signal 171a. Or, if the brake switch 801b is actuated to be in the on state, the control unit 162 receives the brake SW signal 171b. Alternatively, if the brake switches 801a and 801b are both actuated to be in the on state, the control unit 162 receives the brake SW signals 171a and 171b. When the brake switch 801a or 801b is in the on state, the engine 29 can be started.

In step S2b, the rider operates the brake lever 4e or 4c. The brake switch 801a is actuated to be in the on state by the operation of the brake lever 4e. The brake switch 801b is actuated to be in the on state by the operation of the brake lever 4c. At this time, the brake lock indicator Lr flashes in the meter display 151. When the brake switch 801a or 801b is brought into the on state, the engine 29 can be started.

In step S2c, the rider operates the brake lock interlock switch 8. The brake lock switch 802a is actuated to be in the on state by the operation of the brake lock interlock switch 8. At this time, the brake lock indicator Lr is shifted from a flashing state to a lighting state in the meter display 151.

When the brake lock switch 802a is actuated, the brake switch 801a is also actuated by the structure of the brake lock interlocking switch 8. Thus, when the brake lock switch 802a is in the on state, the brake switch 801a is also in the on state. However, as shown in FIG. 19, the brake SW signal 171a differs from the brake lock SW signal 172.

In step S3, the rider starts the engine 29. As described above, in this embodiment, the engine 29 can be started with the starter switch 140a and the electric starter 240. Alternatively, the engine 29 can be started with the kick starter 300.

A method to start the engine 29 with the starter switch 140a and the electric starter 240 is now described. Upon operation of the starter switch 140a, the control unit 162 activates the electric starter 240. However, if the rider tries to start the engine 29 while the brake lock switch 802a is not in the on state, the engine 29 does not start due to the engine start inhibition control Pr. As shown in FIG. 19, as the actuation of the motorcycle 10 at this time, the control unit 162 executes engine start inhibition control $Pr_1$ that inhibits the activation of the starter motor 240 even with the operation of the starter switch 140a. Therefore, the engine 29 cannot be started. Alternatively, the control unit 162 executes engine start inhibition control $Pr_2$ that inhibits the spark plug 55 (see FIG. 8) included in the ignition device 550 of the engine 29 from producing a spark. Therefore, the engine 29 cannot be started. Or, the control unit 162 executes engine start inhibition control $Pr_3$ that inhibits the fuel supply device 20a from supplying fuel to the engine 29. Therefore, the engine 29 cannot be started. The fuel supply device 20a includes a passage for air, which is required for fuel combustion in the engine 29, and for fuel for the engine 29.

The engine start inhibition control $Pr_2$ that inhibits the spark plug 55 from producing a spark is also effective in a case where the engine 29 is started with the kick starter 300. In such a case, even if the crankshaft 46 (see FIG. 8) is forcibly rotated by the kick starter 300 from the outside, the spark plug 55 does not produce a spark. Therefore, the engine 29 cannot be started. In addition, the engine start inhibition control $Pr_3$ that inhibits fuel supply to the engine 29 is also effective in a case where the engine 29 is started with the kick starter 300. In such a case, even if the crankshaft 46 (see FIG. 8) of the engine 29 is forcibly rotated by the kick starter 300 from the outside, fuel is not delivered to the engine 29. Therefore, the engine 29 cannot be started.

The process goes to the engine operation inhibition control Pe after the engine 29 is started. In step S4, it is determined whether or not the main stand 200 is not in the upright state and the main stand switch 201 is in an on state. As described above, when the main stand 200 is in the upright state, the main stand switch 201 is in an off state. On the other hand, when the main stand 200 is in the stored state, the main stand switch 201 is in the on state. When the main stand 200 is not in the upright state, and the main stand switch 201 is on, the process goes to step S6. When the main stand 200 is in the upright state, and the main stand switch 201 is off, the process goes to step S5a. If the main stand 200 is in the upright state in step S4, the main stand 200 may be used to be in the upright state until the process reaches step S4. For example, the main stand 200 may be brought into the upright state before the main power source 161 is turned on in step S1. The main stand 200 may be brought into the upright state before the engine 29 is started in step S3.

In step S5a, it is determined whether or not the brake lock switch 802a is in the on state if the main stand 200 is determined to be in the upright state in step S4. If the brake lock switch 802a is in the off state in step S5a, the process goes to step S5b. If the brake lock switch 802a is in the on state in step S5a, the process goes to step S5c.

In step S5b, the engine 29 started in step S3 comes to rest. In other words, operation of the engine 29 is inhibited when the main stand 200 is in the upright state where the rear wheel 26 is lifted off the road surface, and when the brake lock switch 802a is in the off state after the start-up of the engine 29. Therefore, linkage rotation of the rear wheel 26 when the main stand 200 is in use and thus in the upright state can be prevented.

In step S5c, the main stand switch 201 is turned on. That is, the main stand 200 is shifted from the upright state to the stored state. The rider stores the main stand 200 on the side of the motorcycle 10 as shown in FIG. 14 from the upright state in FIG. 13. Once the main stand 200 is stored on the side of the motorcycle 10, the main stand switch 201 is brought into the on state. When the main stand switch 201 is turned on in step S5c, the process goes to step S6.

In step S6, if the brake lock switch 802a is in the on state, the brake lock switch 802a is turned off. This can be achieved when the rider operates the brake lever 4e and turns off the brake lock switch 802a in the brake lock interlock switch 8. Once the brake lock switch 802a is turned off, the engine speed regulation control Rs is terminated. In other words, if the brake lock switch 802a is in the on state while the engine 29 is running, the speed of the engine 29 is regulated.

When the brake lock switch 802a is turned off after the start-up of the engine 29, the speed regulation of the engine 29 is cancelled. Once the brake lock switch 802a is turned off, the brake lock indicator Lr goes out. This allows the start and travel of the motorcycle 10.

Specific controls of the engine speed regulation control Rs are as follows. The control unit 162 executes the engine speed regulation control $Rs_1$ to the ignition device 550 of the engine 29 that includes spark plug 55 (see FIG. 8) in order to decrease spark frequency of the spark plug 55. This regulates the speed of the engine 29. Alternatively, the control unit 162 executes the engine speed regulation control $Rs_2$ to the fuel supply device 20a in order to suppress fuel supply to the engine 29. This also regulates the speed of the engine 29.

As described before, when the main stand 200 is in the stored state, the main stand switch 201 is in the on state where the switch is actuated. Meanwhile, when the main stand 200 is in the upright state, the main stand switch 201 is in the off state where the switch is de-actuated. Therefore, in this embodiment, the effect of the engine operation inhibition control Pe will not be undermined even with a failure of the main stand switch 201 due to wiring disconnection.

As described above, in this embodiment, the speed of the engine 29 is regulated when the engine 29 is running, and the brake lock switch 802a is actuated to be in the on state. In other words, the engine speed regulation control Rs is executed when the brake lock switch 802a is actuated to be in the on state while the engine 29 is running. Accordingly, even when the rider tries to accelerate by opening the throttle of the engine 29, the speed of the engine 29 is not increased for any degree of the throttle opening. Fuel consumption is thereby reduced when the engine 29 is running, and the brake lock switch 802a is in the on state.

In addition, in this embodiment, the engine start inhibition control Pr can be executed in the motorcycle 10. The engine 29 is not started in the case where the brake lock switch 802a is in the off state after the main power source 161 is turned on. The motorcycle 10 hardly consumes any fuel unless the engine 29 starts running and fuel consumption is thus reduced.

In addition, the speed of the engine 29 is also regulated when the main stand 200 is in the upright state. While the motorcycle 10 is traveling, the vehicle speed is adjusted based on the speed of the engine 29. However, when the main stand 200 is in the upright state, the rear wheel 26 is lifted off the road surface and rotation of the rear wheel 26 by the accelerating operation is not transferred to the road surface. Accordingly, when the main stand 200 is in the upright state, the speed of the engine 29 has no influence on the traveling speed of the motorcycle 10. Thus, if the rider performs the accelerating operation while the main stand 200 is in the upright state, fuel is wasted. However, in this embodiment, the speed of the engine 29 is regulated when the main stand 200 is in the upright state and fuel consumption is thereby reduced.

In this embodiment, the engine speed regulation control Rs can easily be cancelled. When the brake lock switch 802a is in the on state, the engine speed regulation control Rs is executed to regulate the speed of the engine 29. However, when the main stand 200 is in the stored state, and the brake lock switch 802*a* is in the on state, the engine speed regulation control Rs can be cancelled by shifting the brake lock switch 802*a* into the off state. When the main stand 200 is in the upright state, and the brake lock switch 802*a* is in the on state, the main stand switch 201 is first shifted into the off state, and the brake lock switch 802*a* is then shifted into the off state. Then, the engine speed regulation control Rs can be cancelled. As described above, the engine speed regulation control Rs can easily be cancelled such that the motorcycle 10 is able to start off and travel.

In this embodiment, the start-up of the engine 29 can be inhibited by executing the engine start inhibition control Pr with the ignition device 500. Thus, start-up of the engine 29 is easily inhibited.

In this embodiment, the start-up of the engine 29 can also be inhibited by executing the engine start inhibition control Pr with the fuel supply device 20*a*. Thus, start-up of the engine 29 is easily inhibited. In addition, the engine speed regulation control Rs is executed by suppressing fuel supply to the engine 29; therefore, the fuel consumption can further be reduced.

In this embodiment, the control unit 162 receives the brake SW signal 171*b* based on operation of the brake lever 4*c*. In addition, the control unit 162 receives the brake lock SW signal 171*a* based on operation of the brake lever 4*e*. Furthermore, the brake lock switch 802*a* is actuated by actuation of the brake lever 4*e* and the brake lock interlock switch 8. The control unit 162 receives the brake lock SW signal 172 based on actuation of the brake lock switch 802*a*. When the brake lock switch 802*a* is actuated, the control unit 162 simultaneously receives the brake lock SW signal 172 and the brake SW signal 171*a*. The engine start inhibition control Pr is not executed when either the brake SW signal 171*b* or the brake SW signal 171*a* is input. As described above, the engine speed regulation control Rs and the engine start inhibition control Pr are executed by detecting different signals. Therefore, the engine speed regulation control Rs and the engine start inhibition control Pr can be easily executed.

In this embodiment, a switch to regulate the speed of the engine 29 after the start-up of the engine 29 also functions as the brake lock switch 802*a* that retains the rear brake 402 in the actuated state. Accordingly, one switch can lock the rear brake 402 and regulate the speed of the engine 29 simultaneously. Therefore, reduced fuel consumption is realized with a simple operation. In addition, a switch to retain the rear brake 402 in the actuated state also works as a switch to regulate the speed of the engine 29. Accordingly, the speed of the engine 29 does not increase even when the rear brake 402 is actuated, and brake fade is thus suppressed.

The brake lock indicator Lr lights up in the meter display 151 based on actuation of the brake lock switch 802*a*. While the main power source 161 is in the on state, the brake lock switch 802*a* is actuated, and the control unit 162 receives the brake lock SW signal 172, the brake lock indicator Lr can light up. When the main power source 161 is in the on state, and the brake lock switch 802*a* is in the off state, a brake lock indicator Lr flashes. Therefore, a rider can easily visually recognize the brake lock state. Furthermore, by recognizing the brake lock state, the rider operates the brake lock interlock switch 8 for the brake lock when the brake is not locked. Therefore, the brake lock switch 802*a* can reliably be brought into the on state, and thus, the engine speed regulation control Rs can be executed appropriately.

In this embodiment, the speed of the engine 29 can be regulated by executing the engine speed regulation control Rs with the ignition device 500. Thus, the speed of the engine 29 is easily regulated.

In this embodiment, the speed of the engine 29 can also be regulated by executing the engine speed regulation control Rs with the fuel supply device 20*a*. Thus, the speed of the engine 29 is easily regulated. In addition, the engine speed regulation control Rs is executed by suppressing the fuel supply to the engine 29; therefore, fuel consumption is further reduced.

<<Other Modification>>

In the above embodiment, the brake lock switch 802*a* functions both as the switch to lock the rear brake 402 and as the switch to regulate the speed of the engine 29. However, a switch to regulate the speed of the engine 29 is not limited to the brake lock switch 802*a* and another switch can be used.

For example, the motorcycle 10 may have an engine speed regulation switch that is operated by the rider. No limitation is imposed on the shape and position of the engine speed regulation switch as long as it can be operated by the rider. The engine speed regulation switch may not necessarily be included in the brake lock interlock switch 8 of the above embodiment.

Engine speed regulation control Rs, engine start inhibition control Pr, and engine operation inhibition control Pe can be executed when the engine speed regulation switch is turned on. When the engine speed regulation switch is in an on state, the control unit 162 is brought into an energized state where an EG speed regulation SW signal can be detected. Meanwhile, when the engine speed regulation switch is in an off state, the control unit 162 is brought into a de-energized state where the EG speed regulation SW signal cannot be detected.

As in this modification, when the engine speed regulation switch is used, the brake lock switch in FIG. 20 is replaced by the engine speed regulation switch for the engine speed regulation control Rs, the engine start inhibition control Pr, and the engine operation inhibition control Pe. In addition, the brake lock SW signal 172 is replaced by the EG speed regulation SW signal for the controls shown in FIG. 20. However, in this case, the brake switch 801*a* is not always in the on state when the engine speed regulation switch is in the on state. In this case, the on/off state of the brake switch 801*a* is shifted by the operation of the brake lever 4*e*. Furthermore, as described above, the mounting position of the engine speed regulation switch is not particularly limited. However, it is preferably located in the proximity of the steering handle 4 in order to facilitate operation with the brake lever 4*e* or 4*c*.

Moreover, when the engine speed regulation switch is in the on state, the engine 29 can be started by the kick starter 300. When the engine speed regulation switch is in the on state, and either the brake switch 801*a* or 801*b* is in the on state, the engine 29 can be started by the electric starter 240. As described above, start-up methods of the engine 29 can be selected in accordance with the on/off state of the brake switch 801*a* or 801*b* and with the on/off state of the engine speed regulation switch. When the engine speed regulation switch is in the off state, the engine 29 cannot be started by either method. Therefore, when the engine 29 is running, and the engine speed regulation switch is actuated to be in the on state, the speed of the engine 29 is regulated.

The present invention is useful for a motorcycle.

The invention claimed is:
1. A motorcycle comprising:
an engine;
a drive wheel driven by engine torque;

a centrifugal clutch for intermittently transferring torque from the engine to the drive wheel in accordance with engine speed;

a switch for regulating the engine speed;

an engine start inhibition section for inhibiting start-up of the engine when the switch is off; and an engine speed regulation section for regulating the engine speed to prevent engagement of the centrifugal clutch when the switch is on.

2. The motorcycle according to claim 1, further comprising:

a main stand that switches between a stored state where the drive wheel contacts a road surface and an upright state where the drive wheel is lifted off the road surface, wherein the engine speed regulation section is actuated in the upright state.

3. The motorcycle according to claim 2, wherein the upright state is first shifted to the stored state while the switch is on, and then operation of the engine speed regulation section is regulated when the switch is turned off.

4. The motorcycle according to claim 1, further comprising:

an ignition device of the engine, wherein the engine start inhibition section inhibits ignition by the ignition device when the switch is off.

5. The motorcycle according to claim 1, further comprising:

a fuel supply device for supplying fuel to the engine, wherein the engine start inhibition section inhibits fuel supply by the fuel supply device when the switch is off.

6. The motorcycle according to claim 1, further comprising:

a brake mechanism for regulating rotation of the drive wheel or a driven wheel; and a brake switch for detecting an operating state of the brake mechanism.

7. The motorcycle according to claim 6, further comprising:

a first starter for forcibly rotating a crankshaft of the engine and a kick shaft coupled to the crankshaft from outside; and a second starter for forcibly rotating the crankshaft of the engine by an electric motor, wherein the engine start inhibition section permits engine start with the first starter when the switch is turned on, and permits the engine start with the second starter when the switch and the brake switch are turned on.

8. The motorcycle according to claim 6, wherein the brake mechanism has a drive wheel brake mechanism for regulating rotation of the drive wheel, and further includes:

a brake lever for actuating the drive wheel brake mechanism; and a brake lock mechanism for retaining the brake lever in an actuated state, and the switch is a brake lock switch that changes its on/off state according to actuation or non-actuation of the brake lock mechanism.

9. The motorcycle according to claim 1, further comprising:

a switch-on informing device for informing an on/off state of the switch.

10. The motorcycle according to claim 1, further comprising:

an ignition device of the engine, wherein the engine speed regulation section regulates ignition by the ignition device to prevent engagement of the centrifugal clutch when the switch is on.

11. The motorcycle according to claim 1, further comprising:

a fuel supply device for supplying fuel to the engine, wherein the engine speed regulation section regulates fuel supply by the fuel supply device to prevent engagement of the centrifugal clutch when the switch is on.

* * * * *